(12) United States Patent
Moiseenko et al.

(10) Patent No.: US 10,791,051 B2
(45) Date of Patent: Sep. 29, 2020

(54) SYSTEM AND METHOD TO BYPASS THE FORWARDING INFORMATION BASE (FIB) FOR INTEREST PACKET FORWARDING IN AN INFORMATION-CENTRIC NETWORKING (ICN) ENVIRONMENT

(71) Applicant: CISCO TECHNOLOGY, INC., San Jose, CA (US)

(72) Inventors: Ilya V. Moiseenko, San Jose, CA (US); David R. Oran, Cambridge, MA (US); James Cameron Gibson, Belmont, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 67 days.

(21) Appl. No.: 15/490,588

(22) Filed: Apr. 18, 2017

(65) Prior Publication Data
US 2018/0302323 A1 Oct. 18, 2018

(51) Int. Cl.
*H04L 12/725* (2013.01)
*H04L 12/741* (2013.01)
*H04L 29/08* (2006.01)

(52) U.S. Cl.
CPC .......... *H04L 45/745* (2013.01); *H04L 45/306* (2013.01); *H04L 67/327* (2013.01)

(58) Field of Classification Search
None
See application file for complete search history.

(56) References Cited

U.S. PATENT DOCUMENTS

| | | | | |
|---|---|---|---|---|
| 6,690,659 B1* | 2/2004 | Ahmed | ................ | H04W 8/04 370/328 |
| 7,568,047 B1* | 7/2009 | Aysan | ................ | H04L 45/02 370/352 |
| 8,788,823 B1* | 7/2014 | Huang | ................ | H04L 63/10 713/170 |
| 2005/0074001 A1* | 4/2005 | Mattes | ................ | H04L 45/583 370/389 |
| 2009/0319604 A1* | 12/2009 | Hataseki | ................ | G06F 3/0607 709/203 |
| 2010/0150155 A1* | 6/2010 | Napierala | ................ | H04L 45/00 370/390 |
| 2015/0032892 A1 | 1/2015 | Narayanan et al. | | |

(Continued)

OTHER PUBLICATIONS

U.S. Appl. No. 15/479,144, filed Apr. 14, 2017, entitled "Interest Message Path Steering and Multi-Path Traceroute in Information-Centric Networking," Inventor(s): Ilya V. Moiseenko, et al.

(Continued)

*Primary Examiner* — Brandon M Renner
*Assistant Examiner* — The Hy Nguyen

(57) ABSTRACT

A method is provided in one example embodiment and may include receiving an interest packet at a network element, wherein the interest packet identifies content requested by a consumer; determining whether a temporary face identifier (ID) contained in the interest packet is stored at the network element; and forwarding the interest packet to another network element based on a determination that the temporary face ID is stored at the network element, wherein the temporary face ID is associated with a face of the network element connected to the other network element.

20 Claims, 10 Drawing Sheets

(56) References Cited

U.S. PATENT DOCUMENTS

| | | | |
|---|---|---|---|
| 2015/0200852 A1* | 7/2015 | Solis | H04L 45/7453 370/328 |
| 2015/0350078 A1* | 12/2015 | Azgin | H04L 45/306 370/392 |
| 2016/0043963 A1 | 2/2016 | Oran | |
| 2016/0164792 A1 | 6/2016 | Oran | |
| 2016/0241471 A1* | 8/2016 | Wan | H04L 45/74 |
| 2016/0352614 A1* | 12/2016 | Valencia Lopez | H04L 45/021 |
| 2018/0006937 A1* | 1/2018 | Liu | H04L 45/74 |
| 2018/0027609 A1* | 1/2018 | Kojima | H04J 3/0638 370/401 |
| 2018/0205655 A1* | 7/2018 | Ueda | H04L 12/66 |

OTHER PUBLICATIONS

"Configuring MPLS LSP Multipath Tree Trace," Cisco Nexus 7000 Series NX-OS MPLS Configuration Guide, Dec. 2013, Inc., 28 pages.

"Maximum Transmission Unit," from Wikipedia, the free encyclopedia, Jan. 4, 2017, 6 pages.

"MPLS LSP Multipath Trace," Cisco Systems, Inc., Sep. 2, 2015, 5 pages.

"NDN Packet Format Specification 0.2-2 documentation Data Packet," Named Data Networking, First published on or about Jul. 22, 2014; 3 pages.

"NDN Packet Format Specification 0.2-2 documentation Interest Packet," Named Data Networking, First published on or about Jul. 22, 2014; 5 pages.

"Pairing Function," from Wikipedia, the free encyclopedia, Oct. 9, 2016; 5 pages.

Adams, A., et al., "Protocol Independent Multicast—Dense Mode (PIM-DM): Protocol Specification (Revised)," Network Working Group RFC 3973, Jan. 2005; 61 pages.

Arumaithurai, M., et al., "Exploiting ICN For Flexible Management Of Software-Defined Networks," Information-Centric Networking, ACM, Sep. 24-26, 2014, 10 pages; https://pdfs.semanticscholar.org/72fa/28f5e35d72d17a1e8bfe186707645d8d180b.pdf.

Barrera, David, et al., "SCION Five Years Later: Revisiting Scalability, Control, and Isolation on Next-Generation Networks," arXiv:1508.01651v1 [cs.NI], Aug. 7, 2015; 21 pages.

Dabirmoghaddam, Ali, et al., "Characterizing Interest Aggregation in Content-Centric Networks," arXIV:1603.07995v1 [cs.NI], Mar. 25, 2016; 9 pages.

Deering, S., et al., "Internet Protocol, Version 6 (IPv6) Specification," Network Working Group RFC 2460, Dec. 1998; 39 pages.

Fenner, B., et al. "Protocol Independent Multicast—Sparse Mode (PIM-SM): Protocol Specification (Revised)," Network RFC 4601, Aug. 2006; 112 pages.

Ford, A., et al., "TCP Extensions for Multipath Operation with Multiple Addresses," Internet Engineering Task Force (IETF), RFC 6824, Jan. 2013, 65 pages; https://www.rfc-editor.org/rfc/pdfrfc/rfc6824.txt.pdf.

Gallo, M., et al., "Content-Centric Networking Packet Header Format," IETF Internet-Draft draft-ccn-packet-header-00, Jan. 26, 2015; 16 pages.

Ghali, Cesar, et al., "Living in a PIT-LESS World: A Case Against Stateful Forwarding in Content-Centric Networking," arXIV:1512.07755v1 [cs.NI], Dec. 24, 2015; 10 pages.

Jacobson, Van, "Introduction to Content Centric Networking," FISS 09, Bremen, Germany, Jun. 22, 2009; 96 pages.

Jokela, P., et al., "LIPSIN: Line Speed Publish/Subscribe Inter-Networking," SIGCOMM, Aug. 17-21, 2009, 12 pages; http://www.cse.tkk.fi/fi/opinnot/T-110.6120/2012_Autumn_Future_Internet/luennot-files/10-lipsin.pdf.

Jokela, Petri, et al., "LIPSIN: Line Speed Publish/Subscribe Inter-Networking," SIGCOMM'09, Aug. 17-21, 2009, Barcelona, Spain; 12 pages.

Mastorakis, S., "ICN Ping Protocol," ICNRG, Internet-Draft, Aug. 26, 2016, 14 pages; https://tools.ietf.org/pdf/draft-mastorakis-icnrg-icnping-00.pdf.

Perino, Diego, "A Reality Check for Content Centric Networking," ICN '11, Aug. 19, 2011, Toronto, Canada, 6 pages.

Pfister, P., et al., "An IPv6 based BIER Encapsulation and Encoding," Network Working Group Internet-Draft draft-pfister-bier-over-IPv6-01, Oct. 31, 2016; 6 pages.

Pigeon, S., "Pairing Function," MathWorld—A Wolfram Web Resource, Sep. 27, 2016, 2 pages; http://mathworld.wolfram.com/PairingFunction.html.

Rosen, E., et al., "MPLS Label Stack Encoding," Network Working Group RFC 3032, Jan. 2001; 23 pages.

So, Won, et al., "Named Data Networking on a Route: Fast and DoS-resistant Forwarding with Hash Tables.," ANCS '13 Proceedings of the ninth ACM/IEEE symposium on Architectures for networking and communications systems, San Jose, CA, Oct. 21-22, 2013; 11 pages.

Szudzik, M., "An elegant pairing function," InNKS2006 Conference, 2006, 12 pages; http://www.szudzik.com/ElegantPairing.pdf.

Thaler, D., et al., "Multipath Issues in Unicast and Multicast Next-Hop Selection," Network Working Group, RFC 2991, Nov. 2000, 10 pages; https://tools.ietf.org/pdf/rfc2991.pdf.

Trotter, G., "Terminology for Forwarding Information Base (FIB) based Router Performance," Network Working Group RFC 3222, Dec. 2001; 15 pages.

Tsilopoulos, Christos, et al., "Reducing Forwarding State in Content-Centric Networks with Semi-Stateless Forwarding," Proceedings of the IEEE Infocom 2014, 20 pages.

Vahlenkamp, M., et al., "Enabling Information-Centric Networking In IP Networks Using SDN," Future Networks and Services, IEEE, Nov. 2013, 12 pages; https://eclass.uoa.gr/modules/document/file.php/DI379/papers-team10/06702539-ICNoverSDN.pdf.

White, Greg, et al., "Strategy & Innovation: Content Delivery with Contnt-Centric Networking," Cable Television Laboratories, Inc., Feb. 2016; 26 pages.

Wijnands, IJ, et al., "Encapsulation for Bit Index Explicit Replication in MPLS and non-MPLS Networks," IETF Internet-Draft draft-ietf-bier-mpls-encapsulation-06, Dec. 9, 2016; 20 pages.

Wijnands, IJ, et al., "Multicast using Bit Index Explicit Replication," IETF Internet-Draft draft-ietf-bier-architecture-05, Oct. 28, 2016; 36 pages.

You, W., et al., "Dipit: A Distributed Bloom-Filter Based Pit Table For CCN Nodes," Computer Communications and Networks (ICCCN), Jul. 2012, 7 pages; https://www.researchgate.net/profile/Gwendal_Simon/publication/261121661_DiPIT_a_distributed_bloom-filter_based_PIT_table_for_CCN_nodes/links/54d8aaf30cf2970e4e785a52/DiPIT-a-distributed-bloom-filter-based-PIT-table-for-CCN-nodes.pdf.

* cited by examiner

100

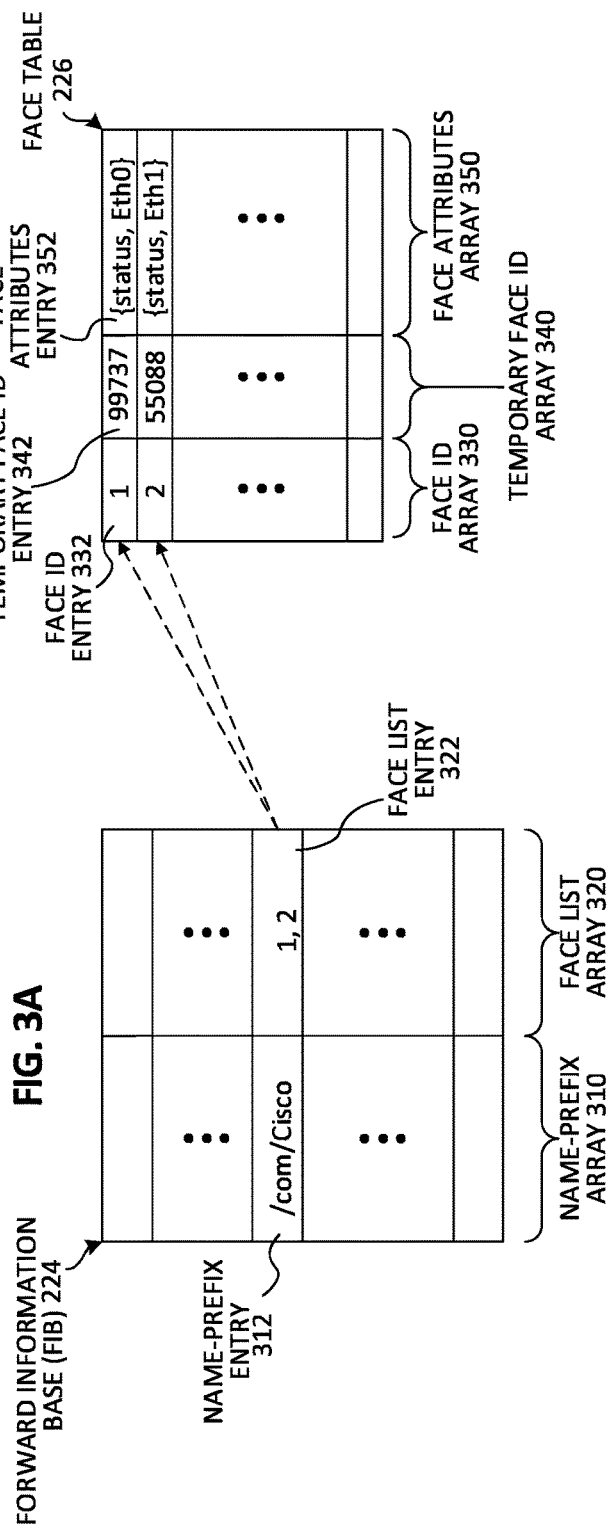

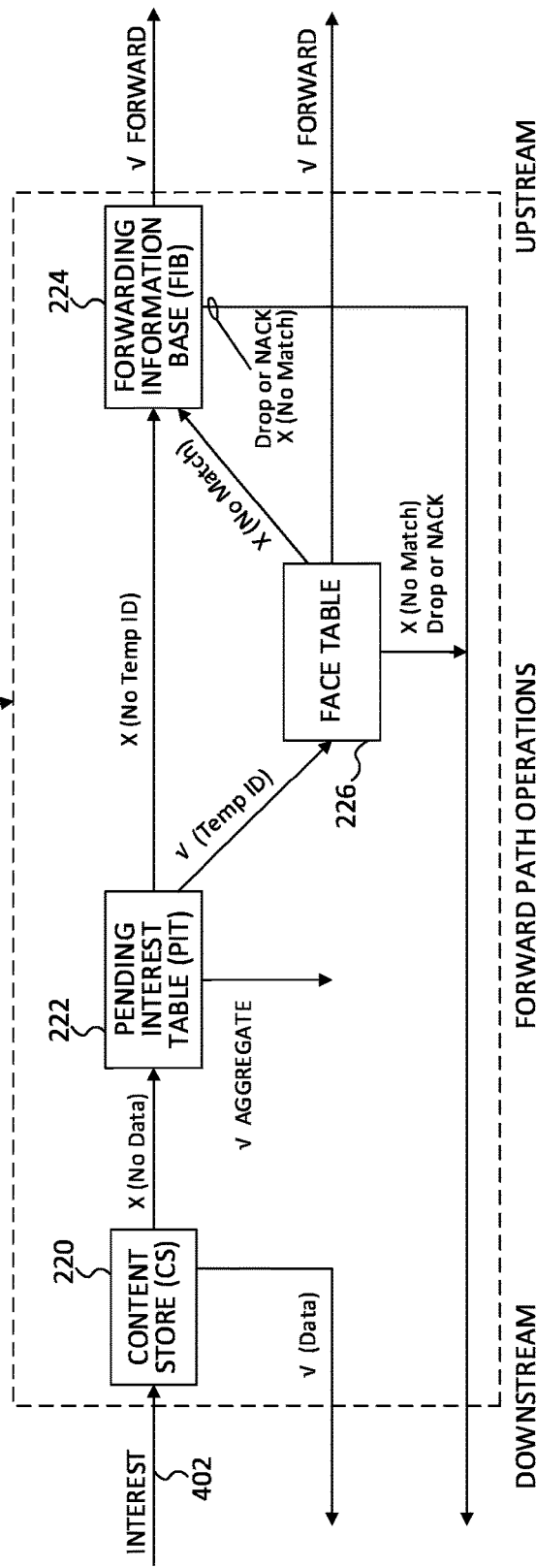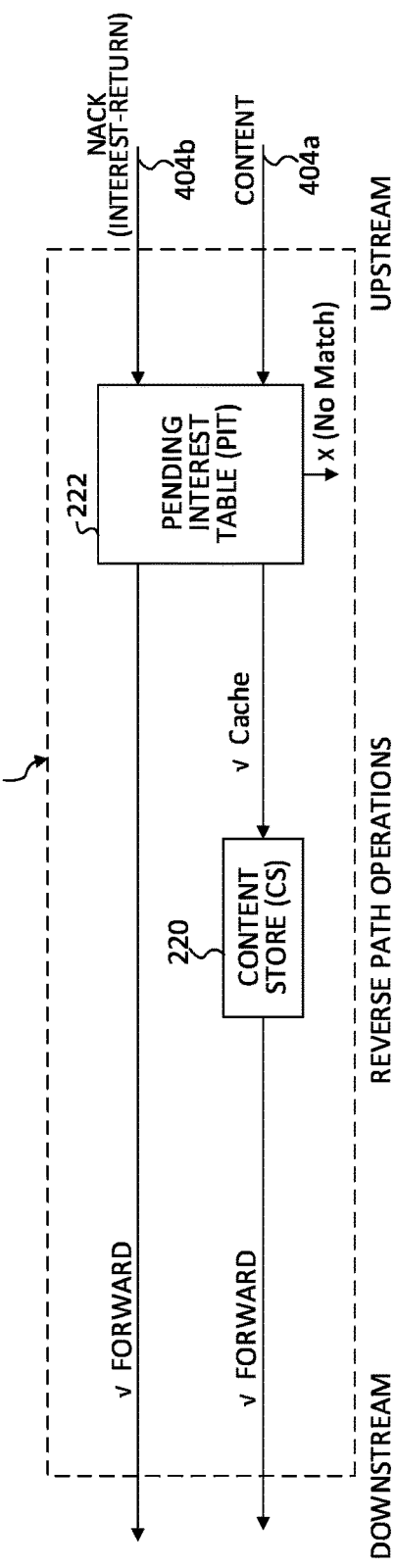

500

600

800

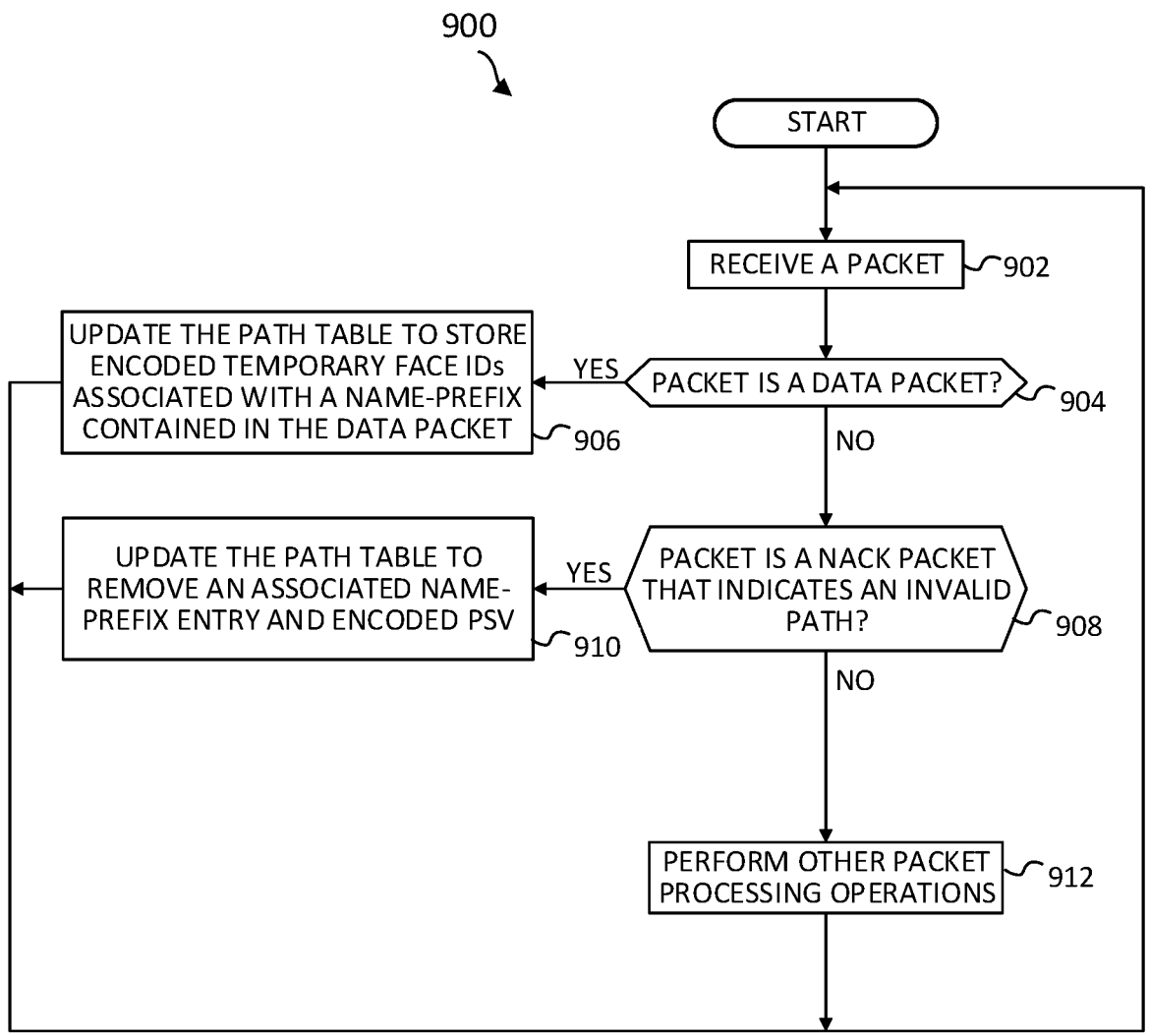

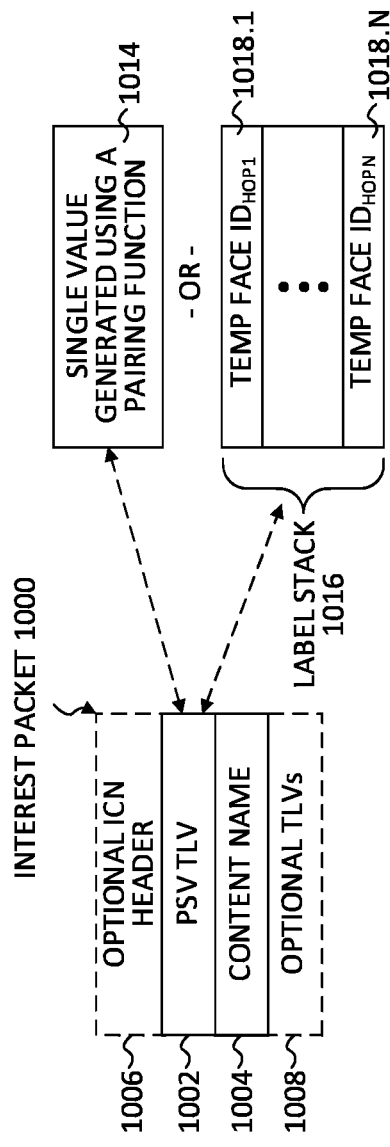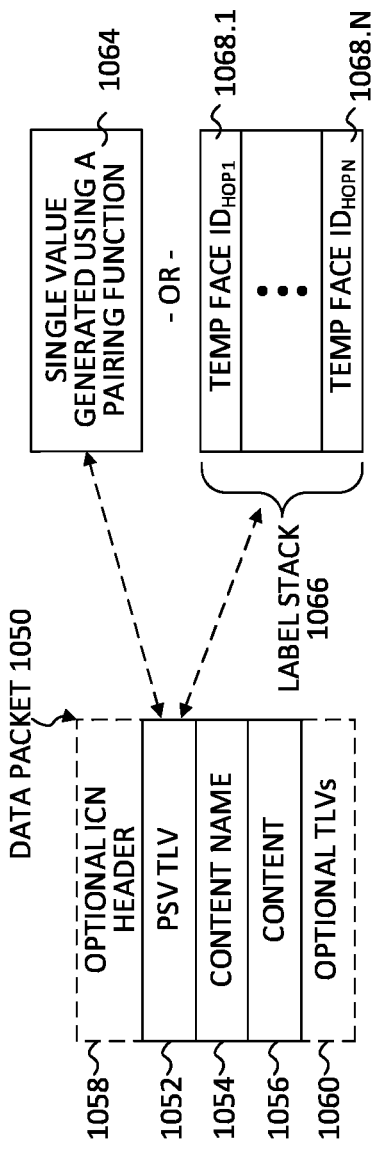

SYSTEM AND METHOD TO BYPASS THE FORWARDING INFORMATION BASE (FIB) FOR INTEREST PACKET FORWARDING IN AN INFORMATION-CENTRIC NETWORKING (ICN) ENVIRONMENT

CROSS-REFERENCE TO RELATED APPLICATION

This application is related to co-pending Non-provisional application Ser. No. 15/479,144, entitled "INTEREST MESSAGE PATH STEERING AND MULTI-PATH TRACEROUTE IN INFORMATION-CENTRIC NETWORKING," filed Apr. 4, 2017 the disclosure of which is considered part of and is incorporated herein by reference in its entirety.

TECHNICAL FIELD

This disclosure relates in general to the field of computer networking, and more particularly, to a system and method to bypass the Forwarding Information Base (FIB) for Interest packet forwarding in an Information-Centric Networking (ICN) environment.

BACKGROUND

Information-Centric Networking (ICN) represents a broad research direction for moving the Internet toward a content/information/data centric network architecture. At least some future network architecture possibilities for ICN are based on empirical research related to network usage and the desire to overcome problems with existing architectures such as Internet Protocol (IP) architectures. ICN and its specific architecture designs, such as Named Data Networking (NDN) and Content Centric Networking (CCN), offer a fundamentally different approach in supporting information dissemination over any type of network. CCN and NDN represent content-based (or data-oriented) networking architectures rather than a host-oriented networking architecture. The flow of messages through a typical ICN network is based on the names of the content in the messages rather than numerically addressed hosts. Message forwarding based on content names presents significant challenges to traffic engineers and administrators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A-3C are simplified schematic diagrams illustrating example details that can be associated with example data structures that can be provisioned for the example network element of FIG. 2 in accordance with at least one embodiment of the communication system;

FIG. 4A is a simplified block diagram illustrating example details that can be associated with forward path operations that can be associated with the network element of FIG. 2 in accordance with at least one embodiment of the communication system;

FIG. 4B is a simplified block diagram illustrating example details that can be associated with reverse path operations that can be associated with the network element of FIG. 2 in accordance with at least one embodiment of the communication system;

FIG. 9 is a simplified flow diagram illustrating example operations that can be associated with a consumer node in accordance with at least one embodiment of the communication system; and FIGS. 10A-10B are simplified schematic diagrams illustrating example details that can be associated Interest and Data packets that can support FIB-bypassing operations in accordance with at least one embodiment of the communication system.

DETAILED DESCRIPTION OF EXAMPLE EMBODIMENTS

Overview

Figure 1:
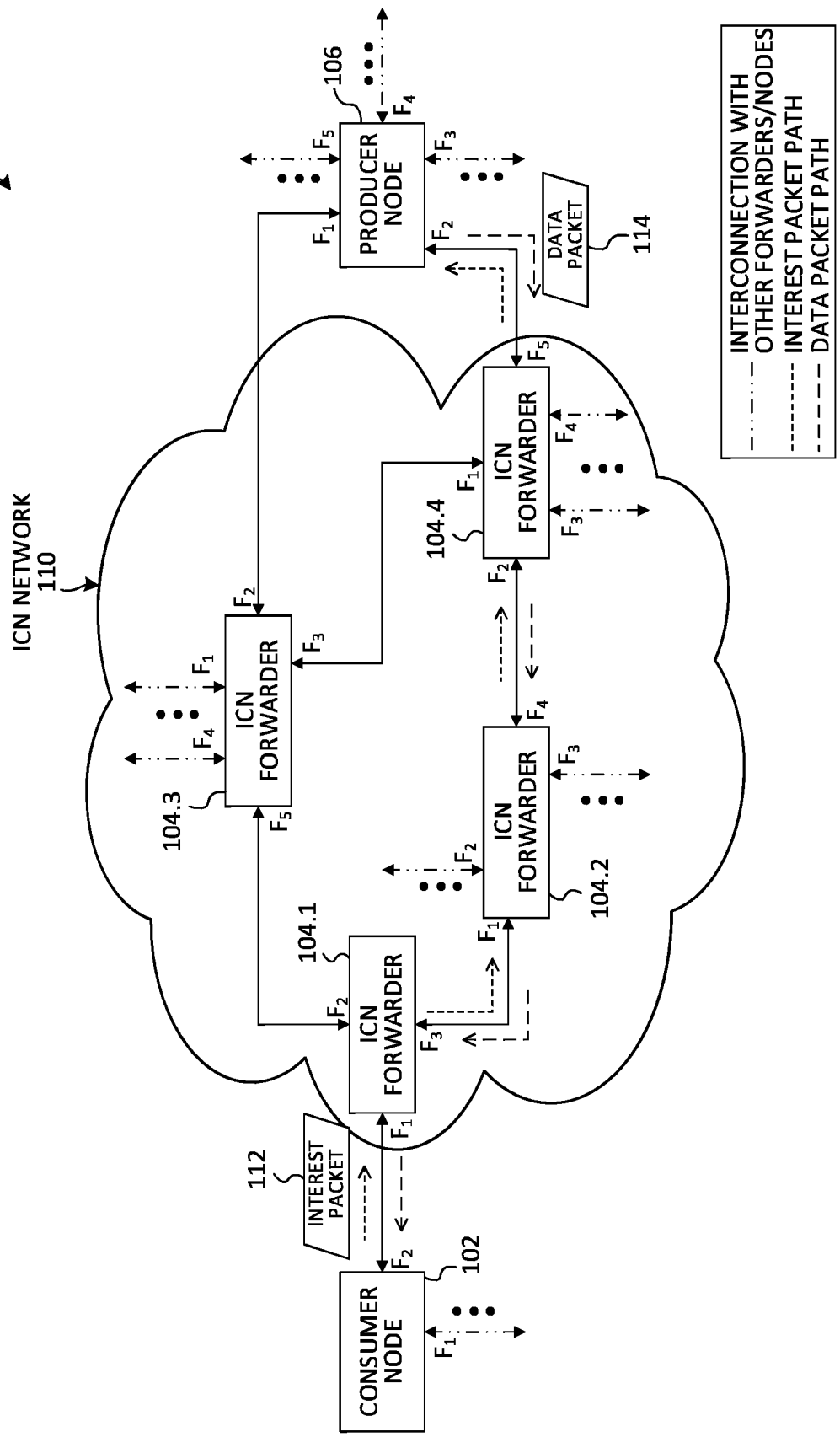
FIG. 1 is a simplified block diagram of a communication system in which FIB-bypassing Interest packet forwarding can be implemented for an Information-Centric Networking (ICN) environment according to at least one embodiment of the present disclosure.

A method is provided in one example embodiment and may include receiving an interest packet at a network element, wherein the interest packet identifies content requested by a consumer; determining whether a temporary face identifier (ID) contained in the interest packet is stored at the network element; and forwarding the interest packet to another network element based on a determination that the temporary face ID is stored at the network element, wherein the temporary face ID is associated with a face of the network element connected to the other network element.

In some cases, the method can further include determining whether a content name associated with the content is stored at the network element based on a determination that the temporary face ID is not stored at the network element; and forwarding the interest packet to another network element based on a determination that the content name is stored at the network element. In some instances, the method can further include performing one of dropping the interest packet or sending a negative acknowledgement toward the consumer that requested the content rather than forwarding the interest packet based on a determination that the content name is not stored at the network element.

In still some cases, the method can further include performing one of sending a negative acknowledgement (NACK) to the consumer rather than forwarding the interest packet based on a determination that the temporary face ID is not stored at the network element; or dropping the interest packet based on a determination that the temporary face ID is not stored at the network element. In still some cases, the method can further include storing the temporary face ID in a Pending Interest Table (PIT) entry associated with the content based on a determination that the temporary face ID is stored at the network element. In still some cases, the method can further include determining a changed entry for a Forwarding Information Base maintained by the network element; determining one or more respective faces impacted by the changed entry; generating a respective new temporary face ID for each respective face impacted by the changed entry; and replacing a respective previously stored temporary face ID for each respective face with the respective new temporary face ID for each respective face.

In still some cases, for data packet processing, the method can further include receiving a data packet at the network element, wherein the data packet identifies content requested by at least one consumer; and encoding a new temporary face ID into the data packet based on a particular face upon which the data packet was received by the network element. In some instances for data packet processing, the method can further include performing a content name lookup on a Pending Interest Table (PIT) stored at the network element to determine whether a content name included in the data packet matches a content name stored in the PIT; based on a determination that the content name included in the data packet matches a content name stored in a PIT entry of the PIT, performing a temporary face ID lookup on the PIT entry to determine whether the new temporary face ID matches a temporary face ID stored for the PIT entry; caching content contained in the data packet and forwarding the data packet to another network element based on a determination that both the content name lookup and temporary face ID lookup succeed; and performing one or more error handling operations based on a determination that either the temporary face ID lookup fails. In still some instances, the encoding can further include one of: adding a label to a label stack for the data packet, wherein the label includes the new temporary face ID; or generating a value using the new temporary face ID and another value contained in the data packet.

Example Embodiments

Referring to FIG. 1, FIG. 1 is a simplified block diagram illustrating example details associated with a communication system 100 in which FIB-bypassing Interest packet forwarding can be implemented for an Information-Centric Networking (ICN) environment according to one embodiment of the present disclosure. FIG. 1 includes a consumer node 102 and a producer node 106 which can communicate over an ICN network 110 using one or more ICN forwarders 104.1-104.4. Although only one consumer node 102, one producer node 106 and four ICN forwarders 104.1-104.4 are illustrated in communication system 100, it should be understood that any number of consumer nodes, producer nodes and/or ICN forwarders can be deployed in communication system 100 depending on needs and/or implementations.

In various embodiments, ICN forwarders (e.g., ICN forwarders 104.1-104.4), consumer nodes (e.g., consumer node 102) and producer nodes (e.g., producer node 106) can encompass network elements that can facilitate or otherwise help to facilitate various FIB-bypassing Interest packet forwarding operations in a network environment as described for various embodiments discussed herein. Generally, communication system 100 can include one or more networks, such as ICN network 110, which represent a series of points or network elements of interconnected communication paths for receiving and transmitting messages (e.g., packets) that propagate through the one or more networks. Each network element (e.g., consumer node 102, producer node 106 and ICN forwarders 104.1-104.4) can be configured with a number of interfaces and 'faces' to facilitate communications in the network.

As referred to herein in this Specification, the term 'interface' is used to describe a functional unit (e.g., a physical network interface) configured for a network element through which packets enter and leave the network element and the term 'face' is used to describe or identify an adjacency to another network element via a logical connection with the other network element. Faces for each network element illustrated for the embodiment of FIG. 1 are labeled using a format '$F_X$' where 'X' corresponds to a Face identifier (ID) for a face configured for a given network element.

In various embodiments, faces configured for network elements of communication system 100 can be configured to facilitate connectivity using various applications and/or protocols including, but not limited to, Internet Protocol (IP), Hypertext Transfer Protocol (HTTP), User Datagram Protocol (UDP) UDP, Transmission Control Protocol (TCP), Multiprotocol Label Switching (MPLS), Segment Routing (SR), tunneling protocols such as Generic Routing Encapsulation (GRE), Point-to-Point Tunneling Protocol (PPTP), Layer Two Tunneling Protocol L2TP), etc. In various embodiments, hardware network interfaces configured for network elements of communication system 100 can include, but not be limited to, Ethernet, Fibre Channel, Institute of Electrical and Electronics Engineers (IEEE) Std. 802.11, etc.

As discussed for various embodiments described herein, faces can be identified using permanent Face IDs, which can be assumed to be stable over the lifetime of a face (e.g., so long as: a tunnel is maintained; an application session is established; a hardware network interface is running; etc.), and non-permanent or 'temporary' Face IDs, which can change over the lifetime of a face based, at least in part, on forwarding path changes, as discussed in further detail herein. The terms 'permanent Face ID' and 'face' can be used herein interchangeably.

In accordance with embodiments described herein, each ICN forwarder 104.1-104.4 (and any other ICN forwarders that may be deployed in ICN network) can be provisioned to maintain a face data structure, referred to herein as a 'Face Table', that can include a number of entries in which each entry identifies a corresponding permanent Face ID for a particular face provisioned for a given ICN forwarder and a corresponding temporary Face ID associated with the particular face. In some embodiments, face attributes such as status indication(s) and/or identification indication(s) can be associated with a particular face. In various embodiments, status indication(s) can include, but not be limited to: a value that indicates whether a face is operational, in an error state, congested, uncongested, combinations thereof or the like. In various embodiments, identification indication(s) can include, but not limited to: face type indications (e.g., Ethernet, Fibre Channel, etc.); a Layer 2 (L2) Medium Access Control (MAC) address; a Layer 3 (L3) IP address; an MPLS label binding; other attributes of a physical interface or logical face; combinations thereof or the like.

As referred to herein in this Specification, the terms 'data structure', 'table', 'database' and variations thereof can be used interchangeably in reference to different options for storing information, data, parameters, etc. for various embodiments described herein.

Face IDs (e.g., 1, 2, 3, 4, etc.) illustrated for each network element (e.g., consumer node, producer node and ICN forwarders) for the embodiment of FIG. 1 can be associated with permanent Face IDs provisioned for each network element. Temporary Face IDs are discussed in further detail herein, below.

Consumer node 102 is illustrated as being provisioned with two faces $F_1$-$F_2$, ICN forwarder 104.1 is illustrated as being provisioned with three faces $F_1$-$F_3$, ICN forwarder 104.2 is illustrated as being provisioned with four faces $F_1$-$F_4$, ICN forwarder 104.3 is illustrated as being configured with five faces $F_1$-$F_5$, ICN forwarder 104.4 is illustrated as being configured with five faces $F_1$-$F_5$, and producer node 106 is illustrated as being configured with five faces $F_1$-$F_5$. The number of faces illustrated for each network element of the embodiment of FIG. 1 is provided for illustrative purposes only and is not meant to limit the broad scope of the present disclosure. Nodes of communication system 100 can be provisioned with any number of faces depending on needs and/or implementations in accordance with various embodiments of communication system 100.

For the embodiment of FIG. 1, communications between consumer node 102 and ICN forwarder 104.1 can be facilitated via face $F_2$ of consumer node 102 and face $F_1$ of ICN forwarder 104.1. Communications between ICN forwarder 104.1 and ICN forwarder 104.2 can be facilitated via face $F_3$ of ICN forwarder 104.1 and face $F_1$ of ICN forwarder 104.2. Communications between ICN forwarder 104.1 and ICN forwarder 104.3 can be facilitated via face $F_2$ of ICN forwarder 104.2 and face $F_5$ of ICN forwarder 104.3. Communications between ICN forwarder 104.2 and ICN forwarder 104.4 can be facilitated via face $F_4$ of ICN forwarder 104.2 and face $F_2$ of ICN forwarder 104.4. Communications between ICN forwarder 104.3 and ICN forwarder 104.4 can be facilitated via face $F_3$ of ICN forwarder 104.3 and face $F_1$ of ICN forwarder 104.4. Communications between ICN forwarder 104.3 and producer node 106 can be facilitated via face $F_2$ of ICN forwarder 104.3 and face $F_1$ of producer node 106. Communications between ICN forwarder 104.4 and producer node 106 can be facilitated via face $F_5$ of ICN forwarder 104.4 and face $F_2$ of producer node 106. Other face(s) of the network elements (e.g., consumer node 102, producer node 106 and ICN forwarders 104.1-104.4) illustrated for the embodiment of FIG. 1 can be interconnected with other network elements of ICN network 110 and/or other networks as may be deployed based on various needs and/or implementations in accordance with various embodiments of communication system 100.

It should be understood that the faces illustrated for the embodiment of FIG. 1 are provided for illustrative purposes only and are not meant to limit the broad scope of the present disclosure. Network elements of communication system 100 can be configured with any number of interfaces and faces depending on needs and implementations in accordance with various embodiments of communication system 100.

For purposes of illustrating certain example techniques of packet forwarding embodiments in communication system 100, it is important to understand communications that may be traversing ICN network 110 and the protocols used in effecting such communications. The following foundational information may be viewed as a basis from which the present disclosure may be properly explained. Such information is offered earnestly and for teaching purposes only and, therefore, should not be construed in a way to limit the broad applications and teachings of the present disclosure.

Information-Centric Networking (ICN) is a new network architecture that differs radically from Internet Protocol (IP) architectures. ICN architectures involve a content/information/data centric network architecture. CCN, NDN and variations thereof (e.g., CCNx® as developed by the Palo Alto Research Center (PARC)) are examples of ICN architectures, each of which can be used as the underlying architecture for implementing FIB-bypassing Interest forwarding embodiments described herein. ICN architectures are based on a premise that the flow of messages through a network is based on the name of the content of the messages.

Communication in a typical ICN network is typically driven by consumer(s) that can initiate requests for information through the exchange of messages. As referred to herein in this Specification, the terms 'consumer application', 'consumer', 'consumer node' and variations thereof can be used interchangeably to refer to a requester of content. There are two basic messages used in typical ICN networks, an Interest message (e.g., an Interest packet), which requests a piece of content by content name using a hierarchical tokenized name-prefix, and a Data message (e.g., a Data packet), which returns the requested named piece of content. In a typical ICN network, name-prefixes might be the only identifiers in the protocols; source addresses or destination addresses may or may not employed. As referred to herein in this Specification, the terms 'Data', 'Content', 'Data packet', 'Data message', 'Content packet' and 'Content Message' can be used interchangeably can be used interchangeably. Further as referred to herein in this Specification, the terms 'Interest', 'Interest packet' and 'Interest message' can be used interchangeably.

A namespace allows content to be referenced by content name using a name-prefix included in Interest and Data packets. A name-prefix is a hierarchical tokenized name for content that contains a sequence of name components. For example, the name-prefix /com/youtube/<mediaID>/audio/<frameID>/<segment#> contains six name components with each name component being delineated by a slash '/'. As illustrated by the <segment#> name component, content can span multiple segments or chunks.

For a content item to be globally accessible, the content item is assigned a globally unique name-prefix. When a consumer desires particular content, the client can generate an Interest packet that includes the name-prefix of the desired content. In at least some instances, the name-prefix of the requested content may be provided by a user or a consumer application that intends to consume the data. An ICN forwarder receiving an Interest packet can perform matching operations to determine whether the content is stored thereat or whether the Interest needs to be forwarded to another network element. The Interest packet can be forwarded along one or more path(s) for any face(s) associated with matching operations performed on the content name (e.g., the name-prefix) included in the Interest packet.

Using the content name, ICN forwarders can forward the Interest packet toward the desired content. The desired content may be found at a particular source that produced the content or at another ICN forwarder along a path to the source. A source that produces content can be referred to herein interchangeably as a 'content source', 'producer application', 'content producer', 'producer node' (e.g., producer node 106) or a 'producer'. For example, in some instances an ICN forwarder between a content source and a consumer may have content stored thereat if the content passed through the network element one or more times (e.g., via one or more Data packets) on its path toward one or more consumer(s). When an Interest packet reaches a network element that contains the desired content (e.g., either a producer or an ICN forwarder along a path toward the producer), the network element can generate a Data packet that includes the content name (e.g., the name-prefix) and the desired content. To reach the consumer that requested the content, the Data packet follows the reverse path taken by the Interest packet.

Implementation of scalable ICN packet forwarding remains a large challenge because ICN forwarding is fundamentally different and inherently more complex than IP forwarding. First, ICN forwarding lookup uses variable-length, hierarchical, tokenized name-prefixes, rather than fixed-length IP addresses. In typical ICN networks, forwarding decisions are made based on either an exact-match or componentized Longest Prefix Match (LPM) of the name-prefix carried in a packet against a set of tables or data structures. For example, consider an ICN Interest packet with the name-prefix /com/cisco/ndn that consists of three name components delimited by '/'. This example Interest can match a lookup with /com/cisco/ndn, or a shorter name-prefix, /com/cisco, or a shorter name-prefix, /com.

Second, ICN architectures typically use three different forwarding data structures: (1) a Content Store (CS) is a buffer and/or cache contained within one or more memory element(s) and/or other storage that stores content associated with previously processed Data packets, in case the content is re-requested; (2) a Pending Interest Table (PIT) is a table that stores the state associated with unsatisfied Interests (e.g., an entry is added into the PIT when a new Interest packet arrives and the entry is removed when it is satisfied by reception of a corresponding Data packet); and (3) a Forwarding Information Base (FIB) fills an analogous role as with IP architectures in that it is used to ascertain next hop information for forwarding Interest packets based on an exact match or a Longest Prefix Match (LPM) of a name-prefix contained in an Interest packet.

The typical ICN Interest forwarding process typically involves consulting each of the three data structures at different points. A substantial fraction of data transfers might take a form of a single related set of fetch operations (e.g., sequences of Interest/Data exchanges similar to HTTP/TCP/IP Get operations) in order to transfer content between consumers and producers. Given the potentially high cost of a full FIB lookup on each Interest Packet, it would be highly desirable to design and implement in ICN forwarders a technique that can bypass FIB lookups for Interest messages, which may make up a single related set of fetch operations for related content (e.g., content having multiple segments, etc.) by replacing FIB lookups with less expensive operations.

Embodiments described herein can resolve the aforementioned issues (and others) associated with expensive FIB lookups used in typical ICN networks by providing a system and method via communication system 100 to facilitate FIB-bypassing Interest packet forwarding within ICN network 110 using temporary Face identifiers (IDs).

According to at least one embodiment of communication system 100, Interest packets (e.g., Interest packet 112, as shown in the embodiment of FIG. 1) and Data packets (e.g., Data packet 114) can be enhanced to carry one or more temporary Face ID(s) that can be used by ICN forwarder(s) to facilitate Interest packet(s) forwarding along an appropriate path toward a given content source while bypassing expensive FIB lookup operations at the ICN forwarder(s).

In at least one embodiment, packets can be enhanced to carry a Path Steering Value (PSV) that can be encoded with temporary Face ID(s) that identify a forwarding path for a given name-prefix. In various embodiments, a PSV can either be a single value produced by a pairing algorithm or can be a composite value or 'stack' of labels. In some embodiments, a PSV can be formatted as a label stack including a number MPLS label(s), each of which can carry temporary Face ID(s) that identify a forwarding path for a given name-prefix. In still other embodiments, packets can be enhanced to carry other types of PSVs that can include labels and/or headers such as, for example, Network Service Header (NSH) headers that can carry temporary Face ID(s) that identify an Interest forwarding path toward a given content source.

A PSV carried in a packet can be modified by transit ICN forwarders based on the arrival face of the packet at every hop as it is transmitted toward a given network element (e.g., toward a producer for Interest packets or toward a consumer for Data packets). For embodiments in which a PSV for a given Data packet is encoded using a pairing algorithm, the PSV can be encoded by every transit ICN forwarder in a manner such that the final value of the PSV, when the Data packet arrives at a given consumer, identifies the unique path that the Data packet traversed to reach the given consumer. For embodiments in which a PSV for a given Data packet is encoded as a composite stack of labels, a label can be pushed to the stack by every ICN forwarder in a manner such that the final stack of labels for the PSV, when the Data packet arrives at a given consumer, identifies the unique path that the Data packet traversed to reach the given consumer. Multiple temporary face IDs can be carried in a PSV encoded as a stack of labels to keep paths consistent along the routing plane. Due to the symmetry of forward (e.g., Interest) paths and reverse (e.g., Data) paths in ICN network 110, the PSV can be placed in subsequent Interest message (s) by the consumer to specify the path that the Interest(s) can traverse to fetch the same data or similar data (e.g. next chunk or segment of data).

A PSV included with a given Interest packet can be decoded by every transit ICN forwarder along a path to steer the Interest packet upstream toward a given content source. Decoding performed by transit ICN forwarders can vary depending on whether PSVs are encoded using a pairing function or are encoded as a composite stack of labels. Different PSV encoding and decoding operations that can be performed using pairing functions or label stacks are discussed in further detail below. The term 'upstream' can be used herein in reference to a content source (e.g., a producer or ICN forwarder) and the term 'downstream' can be used herein in reference to a content consumer (e.g., a consumer or ICN forwarder).

As noted above, each ICN forwarder 104.1-104.4 (and any others that may be deployed in communication system 100) can be provisioned to maintain a list of faces within an face data structure, database, etc. (e.g., Face Table) that can be used to identify logical connection(s) to adjacent network element(s) (e.g., other ICN forwarder(s), consumer node(s) or producer node(s)) for one or more communication technologies, protocols and/or applications (e.g., Ethernet, Fibre Channel, IP, UDP, TCP, MPLS, SR, GRE, etc.). By 'identifying a unique path', it is meant that a PSV contained in an Interest packet can dictate to each transit ICN forwarder which outgoing face the ICN forwarder is to use for forwarding the Interest packet upstream to a next hop.

PSV Encoding and Decoding Using Pairing Functions

For embodiments in which packets are enhanced to include a PSV that is encoded using a pairing function, an entire path can be encoded into a single unique value, which can be mutated at every hop. For Data packet processing, the single unique value can be generated by a mathematical pairing algorithm that can be readily implemented with low overhead using PSV logic that can be provisioned for the forwarding logic of an ICN forwarder (e.g., for each ICN forwarder 104.1-104.4). In at least one embodiment, the algorithm can be formulated more formally as a problem of encoding N numbers (e.g., N temporary Face IDs) $\{x_1, \ldots, x_N\}$ into a single number in such a manner that numbers $\{x_1, \ldots, x_N\}$ can be recovered afterwards.

In accordance with at least one embodiment, one proposed mathematical algorithm can be based on a pairing function 'P' that can be used to uniquely encode two natural numbers into a single natural number, which can be represented mathematically as: P(x1, x2)=y. An inverse pairing function (denoted herein as '!P' or 'Inv-P') must also exist to enable an unambiguous and deterministic recovery of both values (x1, x2) from a single natural number. Such a relationship can be represented mathematically as: !P(y)= [x1, x2]. A pairing function can be used recursively to encode an arbitrary number of natural numbers (e.g., pairing of a face value with a pairing value).

Consider a general example involving three natural numbers x1, x2 and x3. For [x1, x2, x3] an encoding (e.g., pairing) process can be performed as represented in Equations 1 (Eq. 1) and Equation 2 (Eq. 2), shown below, to encode a single value 'y2' such that:

$$P(x1,x2)=y1 \quad \text{Eq. 1}$$

$$P(y1,x3)=y2 \quad \text{Eq. 2}$$

Equation 2 might also be represented as pairing a face value (x3) with a pairing value (P(x1, x2) such as: P(P(x1, x2), x3)=y2. For example, a PSV carried in Data packet 114 can be represented as [P(P(F5,0), F4), F3] once the Data packet 114 reaches consumer node 102.

In order to recover [x1, x2, x3], y2 can be decoded (e.g., unpaired) using a decoding process that can be performed as represented in Equation 3 (Eq. 3) and Equation 4 (Eq. 4), shown below, such that:

$$!P(y2)=[y1,x3] \quad \text{Eq. 3}$$

$$!P(y1)=[x1,x2] \quad \text{Eq. 4}$$

In various embodiments, different pairing functions can be utilized to facilitate PSV generation at each hop of a Data packet as it is forwarded to a given consumer and can include, but not be limited to, Cantor pairing functions, Hoperoft-Ullman (HU) pairing functions or bitwise pairing functions. Cantor pairing functions and HU pairing functions are theoretically proven pairing functions, which involves only a few arithmetic operations (multiplication, division and three additions) in order to encode (e.g., pair) two values and a few different arithmetic operations (square root, multiplication, division, addition and subtraction) in order to decode (e.g., unpair) a single value into the two values that were used to encode the single value. A bitwise pairing function may be faster than a Cantor or HU pairing function as it only involves bit permutations.

For Interest packet processing, a PSV carried in an Interest can be decoded using the inversion of the same pairing function that was used to encode the PSV to decode the PSV into two values. Various operations can be performed on the two values, as discussed in further detail herein. In at least one embodiment, an encoded PSV can be decoded into two values; one value may be used to identify an outgoing face for the Interest at a particular ICN forwarder and another value may be used to update the PSV for the forwarded Interest such that a next-hop ICN forwarder can perform another decoding operation on the PSV.

PSV Encoding and Decoding Using Label Stacking

For embodiments in which packets are enhanced to include a PSV that is encoded using label stacking, an entire path can be encoded into a single label stack, which can be mutated at every hop. For Data packet processing, every transit ICN forwarder along the path of a given Data packet toward a given consumer can push, tag, append, or otherwise add a label onto the label stack such that the final label stack for the PSV, when the Data packet arrives at a given consumer, identifies the unique path that the Data packet traversed to reach the given consumer. For Interest packet processing, every transit ICN forwarder along the path of a given Interest packet toward a given content source can 'pop' the label stack to remove the topmost label from the stack to perform one or more operations using the label, as discussed in further detail herein.

Example System Operations

As noted above, embodiments described herein provide a system and method via communication system 100 to facilitate FIB-bypassing Interest packet forwarding within ICN network 110. Before discussing full-featured FIB-bypass forwarding details of certain embodiments described herein, a brief discussion is provided for a naïve algorithm for FIB-bypass forwarding when a PSV encoded using a pairing function is present in an Interest packet and represents a valid multi-hop path. Note, a path need not be multi-hop for embodiments discussed herein; the discussion involving the naïve algorithm for ICN forwarding using a pairing function encoded PSV for a multi-hop path is provided for illustrative purposes only and is not meant to limit the broad scope of the teachings of the present disclosure.

For discussions involving the naïve algorithm for FIB-bypass forwarding, it is assumed that a face data structure configured for each ICN forwarder is provisioned only with the permanent Face ID of each face provisioned for each ICN forwarder.

During operation, when a given Interest packet containing a PSV arrives at a particular ICN forwarder, the ICN forwarder can unpair or decode the PSV into two numbers say, for example, [x1, x2]. One of these numbers can correspond to a particular permanent Face ID that the Interest packet is to exit at this particular ICN forwarder and the other number can correspond to another PSV pair that is to be decoded at the next-hop ICN forwarder.

In some embodiments, it may not be possible for the particular ICN forwarder to determine which of the two decoded numbers corresponds to another PSV pair and which corresponds to a valid permanent Face ID. In such embodiments, the particular ICN forwarder can perform a lookup on its face data structure using both x1 and x2. In other embodiments, depending on the pairing function selected for PSV encoding, a relationship of the two decoded numbers may be realized such that one of the two decoded numbers can be associated with a Face ID and the other number can be associated with another PSV pair to be decoded by a next-hop forwarder. For example, in at least one embodiment, pairing using a Cantor pairing function might result in the smaller of two decoded numbers being associated with the outgoing Face ID and the larger of the two decoded numbers being associated with another PSV to be decoded by a next-hop ICN forwarder. The particular ICN forwarder can perform a comparison between the two decoded numbers to determine the smaller number.

Returning to the example operations involving the naïve algorithm for FIB-bypass forwarding, the particular ICN forwarder will perform a lookup on its face data structure using one or both decoded numbers. In an ideal case involving the naïve algorithm for FIB-bypass forwarding, if the ICN forwarder determines that one of the decoded numbers corresponds to a valid face entry in the face data structure (e.g., it corresponds to a valid permanent Face ID provisioned in the data structure), the ICN forwarder can create a new PIT entry for its PIT data structure and can forward the Interest along with a new PSV (e.g., the other decoded number) using the determined face without consulting with its FIB.

However, in a non-ideal case, if the ICN forwarder determines that the PSV is invalid or if a face identified in the PSV is deactivated (either by administrative action or by a link failure) the lookup using one or both of the decoded numbers can fail, which can result in the ICN forwarder needing to perform a full FIB lookup in order to attempt to forward the packet. If the full FIB lookup fails, the ICN forwarder can send a negative acknowledgment (NACK) packet, sometimes referred to as an 'Interest-Return', to the consumer that requested the data in which the NACK indicates that the Interest contained an invalid path label (e.g., an invalid Face ID) rather than forwarding the Interest packet or the ICN forwarder can drop the Interest packet. If the Interest packet is forwarded based on a successful FIB lookup, the ICN forwarder can remove the PSV because the path to the content has changed.

A major disadvantage of the naïve algorithm for FIB-bypass forwarding is that route updates (e.g., FIB entry removals and modifications (e.g., name removals and/or next-hop face changes for a given name) occur much more frequently than face (e.g., tunnel) removals and according to the naïve algorithm, Interests will continue to be forwarded according to PSVs contained in Interests even when no route for a given name exists in the FIB.

To address this major flaw of the naïve algorithm, embodiments of communication system 100 provide for the introduction of a new temporary Face ID that can be used to facilitate full-featured FIB-bypass forwarding within communication system 100. In addition to the permanent Face IDs (e.g., 1, 2, 3, 4 . . . ) which are stable over the lifetime of a face and can be used for a) referencing entries in the face data structure (e.g., Face Table) from corresponding FIB entries and/or b) performing administrative tasks (e.g., adding or removing a face, etc.), a corresponding temporary Face ID can be generated and associated with each corresponding permanent Face ID included in the Face Table. In at least one embodiment, a temporary Face ID can be a 32-bit random value assigned to a face that might change multiple times over the lifetime of the face each time a route update impacts the face. Use of 32-bit values can decrease the likelihood of collisions between randomly generated temporary Face IDs.

Both a temporary Face ID and a permanent Face ID for each of a given face provisioned for a given ICN forwarder can be stored in the Face Table maintained for the ICN forwarder to support the ability to find the state and attributes of a given face efficiently using either the permanent Face ID or the temporary Face ID associated with the face. It should be noted that associations used to link faces (e.g., permanent Face IDs) and temporary Face IDs can be stored in any manner depending on needs and/or implementations.

In some embodiments, storage (e.g., data structure, database, etc.) can be provisioned to accommodate an array of permanent Face ID pointers (in which Face ID is an index) and an array of temporary Face ID pointers (in which temporary Face ID is an index). In other embodiments, storage can be provisioned to accommodate an array of permanent Face ID values and a corresponding array of 32-bit temporary Face ID values associated with each permanent Face ID value. In still other embodiments, storage can be provisioned to accommodate a hash table in which hashes of 32-bit temporary Face ID values are stored in association with a pointer to a face. These examples for storing face and temporary Face ID associations are only a few of the many possible options for storing such associations and are not meant to limit the broad scope of the present disclosure. Virtually any other associations can be stored to link faces and temporary Face IDs using similar means and methods as those described herein and, thus, are clearly within the scope of the present disclosure.

During operation of a given ICN forwarder, if a FIB entry is changed (e.g., if a FIB entry is removed from the FIB data structure or if a next-hop entry from a FIB entry is removed), the ICN forwarder generates a new random temporary Face ID for face(s) impacted by the changed FIB entry. In some embodiments, when a new random temporary Face ID is generated for a given face, a pointer for the temporary Face ID can be relocated to the new index and the previous index (e.g., the previous temporary Face ID) can stores a null pointer (null_ptr). In other embodiments, if associations involving temporary Face ID values or hashes thereof are stored, the entry for a previous (now invalid) temporary Face ID value or hash thereof can be updated based on the newly generated temporary Face ID for a given face. As noted previously, virtually any associations can be stored using to link faces with temporary Face IDs and, thus, are clearly within the scope of the present disclosure.

For embodiments involving PSVs encoded using a pairing function, PSV encoding by a given ICN forwarder on the reverse path (e.g., for Data packet processing) can be used to pair a given PSV carried in a given Data packet with a temporary Face ID rather than a permanent Face ID for a given face on which the Data packet was received and including the encoded PSV in the given Data packet. In such embodiments, a first ICN forwarder that receives a Data packet from a producer (e.g., ICN forwarder 104.4 receiving Data packet 114 from producer node 106) can initialize a PSV using a pairing of PSV=(TempFaceID$_{RCV}$, TempFaceID$_{RSV}$) where 'TempFaceID$_{RSV}$' is the temporary Face ID associated with the face upon which the Data message was received and 'TempFaceID$_{RSV}$' can be set to a reserved value such as zero, for example, such that the value does not correspond to either a valid permanent Face ID or a temporary Face ID that might be used within ICN network 110. An ICN forwarder can determine that it is a 'first' forwarder to receive a Data packet from a producer based on some combination of discovery protocols and/or configuration that identifies that it is the first forwarder.

For embodiments involving PSVs encoded as a stack of labels, PSV encoding can include pushing a label to a label stack carried in a given Data packet such that a label pushed to the stack can represent a temporary Face ID for a given face on which the Data packet was received.

A first ICN forwarder can include an encoded PSV in a received Data packet (e.g., as PSV TLV) for further encoding (e.g., using a pairing function or label stacking) by subsequent next-hop forwarders as the Data packet is forwarded downstream toward a consumer that requested content.

For embodiments involving PSVs encoded using a pairing function, PSV decoding on the forward path for Interest packet processing can include operations in which a given ICN forwarder, upon receiving an Interest packet containing a PSV, can unpair the PSV into two numbers and can perform a lookup on the face data structure (e.g., the Face Table, etc.) maintained at the ICN forwarder using one or both decoded number(s) to determine whether an association to a permanent Face ID is stored at the forwarder (e.g., whether the PSV contained a valid temporary Face ID contained in the face data structure). For embodiments involving PSVs encoded as a stack of labels, PSV decoding on the forward path for Interest packet processing can include operations in which a given ICN forwarder, upon receiving an Interest packet containing a PSV, can pop the topmost label from the label stack and can perform a lookup on the face data structure maintained at the ICN forwarder using the temporary Face ID to determine whether an association to a permanent face ID is stored at the forwarder.

Based on a determination that a temporary Face ID decoded from the PSV contained in the Interest packet is stored in association to a given permanent Face ID (e.g., the lookup returns the permanent Face ID, a pointer to the permanent Face ID, etc.), the ICN forwarder can determine that no FIB lookup is needed, can update the PSV to be the larger decoded number, and can forward the Data packet along the path corresponding to the valid permanent Face ID.

However, based on a determination that no temporary Face ID decoded from the PSV contained in the Interest packet is stored at the ICN forwarder, the ICN forwarder can be configured to perform any of: a normal, full FIB lookup (e.g., using exact-match or LPM operations); sending a NACK is to the consumer rather than forwarding the Interest packet; or dropping the Interest packet. In various embodiments, ICN forwarders 104.1-104.4 can be configured to either perform normal FIB lookup operations or to perform NACK or drop operations upon determining that no temporary Face ID is stored that matches a temporary Face ID decoded from a PSV contained in an Interest packet.

If an ICN forwarder is configured to perform full FIB lookups and, if the FIB lookup is successful, the forwarder can forward the Interest packet along one or more outgoing face(s) based on the FIB lookup. In such embodiments, the ICN forwarder will remove the PSV from the Interest packet and forward the packet to a next-hop further upstream toward a content source. However, if the FIB lookup is unsuccessful, the ICN forwarder can drop or NACK the Interest packet. Each ICN forwarder along the path of an Interest packet can perform similar FIB-bypassing operations as discussed herein.

In some cases, an ICN forwarder can receive an Interest packet in which the PSV=0 or in which there is no PSV TLV (e.g., for an initial Interest packet generated by a consumer and/or for an Interest packet in which the PSV has been removed by a previous-hop. In such cases, forwarding can be performed using normal FIB lookup operations on such Interest packets.

One potential drawback of the solution provided by communication system 100 may be that when a same face is identified for multiple name-prefix entries in the FIB and only one of these name-prefix entries is removed then the face(s) for the removed name-prefix entry will be renumbered, which can temporarily (e.g., approximately 1 Round-trip Time (1RTT) or a few more) affect other flows having different name-prefixes that are also to be forwarded using the same face(s) for which new temporary Face ID(s) have been generated. However, the solution provided by communication system 100 ensures proper forwarding of such packets by reverting to FIB lookup operations; thereby, only causing expensive FIB lookups for the name-prefixes that happen to share the same face with the deleted FIB entry name-prefix.

Example PSV Formats

In some embodiments, Interest and Data packets can be enhanced to carry a PSV in a type-length value (TLV) format within a TLV element or field provisioned for packets. For example, CCN Interest and Data packets are provisioned to accommodate optional TLVs that can be included in packets. Generally, a TLV format includes a Type field, a Length field and a Value field. The Type field contains a type of data that is carried in the Value field. In some embodiments, the Length field can contain the length of the value field. In other embodiments, the Length field may contain the length of the TLV (e.g., the length of a packet). Finally, the Value field contains the data to be processed.

For embodiments in which a PSV is formed using a pairing function, a PSV TLV can be included in Interest and Data packets in a TLV format as follows:
PSV:=PSV-TYPE TLV-LENGTH PSV-VALUE
PSV-TYPE:=Vendor Specific
PSV-LENGTH:=VAR-NUMBER
PSV-VALUE:=VAR-NUMBER As shown above, a PSV TLV representing a PSV encoded using a pairing function can be formatted such that the PSV-TYPE field can be set to a unique value that identifies the TLV as an encoded PSV, the TLV-LENGTH field can identify a variable number (VAR-NUMBER) length of the TLV and the PSV-VALUE field can identify the encoded PSV carried in a packet that can be mutated (e.g., encoded or decoded, depending on packet direction) at each of a given forwarder along the path in ICN network 110.

For embodiments in which a PSV is formed as a composite stack of labels, one possible PSV TLV can be included in Interest and Data packets in a TLV format as follows:
PSV:=PSV-TYPE TLV-LENGTH PSV-VALUE
PSV-TYPE:=Vendor Specific
PSV-LENGTH:=VAR-NUMBER
PSV-VALUE:=Temporary Face ID(Hop1)
. . . .
Temporary Face ID(HopN)

As shown above, a PSV TLV representing a PSV encoded using a label stacking can be formatted such that the PSV-TYPE field can be set to a unique value that identifies the TLV as an encoded PSV, the TLV-LENGTH field can identify a variable number length of the TLV and the PSV-VALUE field can identify an N number temporary face IDs for N number of ICN forwarder hops (Hop1-HopN) representing a multi-hop path for a packet that can be mutated (e.g., encoded or decoded, depending on packet direction) at each of a given forwarder along the path in ICN network 110.

Figure 2:
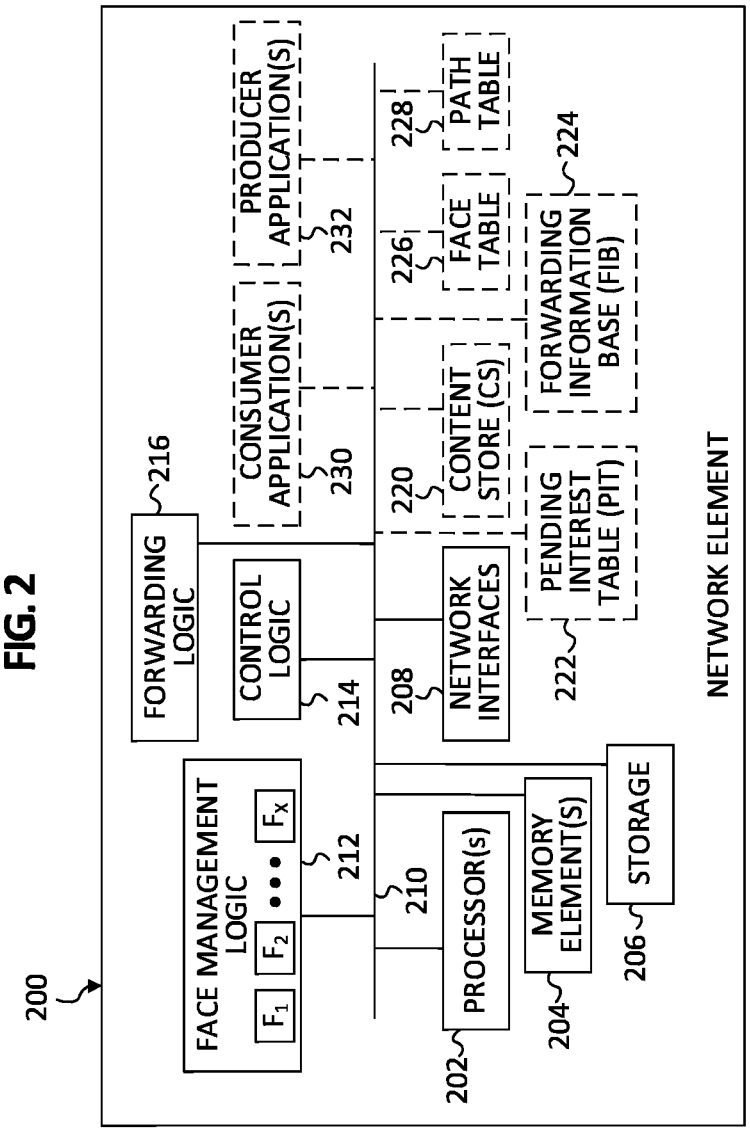
FIG. 2 is a simplified block diagram illustrating example details that can be associated with an example network element that can be configured to operate in the communication system in accordance with at least one embodiment.

Referring to FIG. 2, FIG. 2 is a simplified block diagram illustrating example details that can be associated with an example network element 200 that can be configured to operate in communication system 100 in accordance with at least one embodiment. As noted previously, ICN forwarders (e.g., ICN forwarders 104.1-104.4), consumer nodes (e.g., consumer node 102) and producer nodes (e.g., producer node 106) can be network elements that can facilitate or otherwise help to facilitate various FIB-bypassing Interest packet forwarding operations in a network environment as described for various embodiments discussed herein. Accordingly, network element 200 can represent any consumer node, producer node or ICN forwarder that may be deployed in communication system 100, depending on implementation, to facilitate FIB-bypassing Interest packet forwarding operations in accordance with various embodiments of communication system 100.

In at least one embodiment, network element 200 can include can include one or more processor(s) 202, one or more memory element(s) 204, storage 206, network interfaces 208, a bus 210, face management logic 212, forwarding logic 216 and control logic 214.

For implementations in which network element 200 is implemented as a consumer node (e.g., consumer node 102) or a producer node (e.g., producer node 106), the network element can further include one or more consumer application(s) 230, one or more producer application(s) and a Path Table 228. Recall, consumer nodes can sometimes perform operations as producer nodes and vice-versa.

For implementations in which network element 200 is implemented as an ICN forwarder (e.g., ICN forwarders 104.1-104.4), the network element can maintain various data structures including a content store (CS) 220, a Pending Interest Table (PIT) 222, a Forwarding Information Base (FIB) 224 and a Face Table 226. In some embodiments, ICN forwarders can additionally be provisioned with consumer application(s) 230, producer application(s) 232 and/or Path Table 228 to perform various operations such as, for example, pinging and/or traceroute operations to identify paths or path changes throughout ICN network 110.

In at least one embodiment, processor(s) 202 is/are at least one hardware processor configured to execute various tasks, operations and/or functions for network element 200 as described herein according to software and/or instructions configured for the network element. In at least one embodiment, memory element(s) 204 and/or storage 206 is/are configured to store data, information, software, instructions and/or logic associated with network element 200 (e.g., data structures, logic, etc. can, in various embodiments, be stored using any combination of memory element(s) 204 and/or storage 206).

In various embodiments, network interfaces 208 can enable communication between network element 200 and other network elements that may be present in communication system 100 to facilitate operations as discussed for various embodiments described herein. In various embodiments, network interfaces 208 can be provisioned to support one or more communication protocols, routing protocols, etc., one or more Ethernet driver(s) and/or controller(s), Fibre Channel driver(s) and/or controller(s), or other similar protocols, network interface driver(s), and/or controller(s) to enable communications for network element 200 within communication system 100.

In at least one embodiment, bus 210 can be configured as an interface that enables one or more elements of network element 200 (e.g., processor(s) 202, memory element(s) 204, logic, faces, interfaces, etc.) to communicate in order to exchange information and/or data. In at least one embodiment, bus 210 may be implemented as a fast kernel-hosted interconnect, potentially using shared memory between processes (e.g., logic, etc.), which can enable efficient communication paths between the processes.

Regarding various data structures that may be maintained by network element 200, content store (CS) 220 may store a temporary cache of data packets received from an upstream network element, for example, a data producer or an upstream ICN forwarder. In some embodiments, data packets can be cached to satisfy future interests. PIT 222 is provisioned to store entries for Interest packets that network element 200 has forwarded upstream but have not yet been satisfied. Each entry in PIT 222 can include the name-prefix or Interest of data requested in an Interest packet, incoming and outgoing face(s) associated with the name-prefix or Interest, and a temporary Face ID or a list of temporary Face IDs associated with the outgoing face(s) for the Interest. Forwarding information Base (FIB) 224 can be either manually configured or populated with a name-prefix based routing protocol. Multiple output faces may be provided for each name-prefix entry included in the FIB 224.

Face Table 226 can be populated with associations that link permanent Face IDs with their corresponding temporary Face IDs. Face attributes (e.g., status indication(s), identification indication(s), etc.) associated with each face provisioned for network element 200 can also be stored in Face Table 226. As discussed for various embodiments described herein, a face can have different temporary Face IDs associated therewith as changes may occur for one or more entries in the FIB.

For embodiments in which network element 200 is implemented to provide consumer functionality, Path Table 228 can be populated with per-name-prefix PSV associations (e.g., {name-prefix→PSV}) based on PSVs (e.g., pairing type PSVs, label stack type PSVs, header type PSVs, etc.). The granularity in which name-prefixes may be stored in Path Table 228 can be varied based on different needs and implementations (e.g., a base name-prefix may be stored for content that is made up of multiple segments).

In various embodiments, consumer application(s) 230 that may be provisioned for network element 200 can be provisioned to request data from the ICN network 110 via one or more Interest packets. Upon determining a need to request data from the ICN network 110, the consumer application 230 can query the Path Table 228 to determine whether an encoded PSV associated with the name-prefix for the data request is identified in the Table. If so, the consumer application 230 can cooperate with forwarding logic 216, control logic 214, etc. to append, tag, or otherwise include the encoded PSV into Interest packets injected into the ICN network 110 thereby enabling transit ICN forwarder(s) along the path to a given content source to potentially bypass expensive FIB lookup operations while forwarding the Interests toward the content source.

In various embodiments, producer application(s) 232 can be provisioned to send data to the ICN network 110 via one or more Data packets in response to one or more received Interest packets requesting data that may be stored at network element 200. Upon determining a need to send data to the ICN network 110, a producer application 232 can cooperate with forwarding logic 216, control logic 214, etc. to inject one or more Data packet(s) into the network. In some embodiments, the injecting can include appending, tagging, or otherwise including an encoded PSV in one or more Data packet(s).

In at least one embodiment, face management logic 212 can include instructions that, when executed (e.g., by processor(s) 202), enables communications between network element 200 and other network elements that may be present in communication system 100 via an 'X' number of faces $F_1$-$F_X$ provisioned for the network element 200 to facilitate operations discussed for various embodiments described herein.

In various embodiments, forwarding logic 216 can include instructions that, when executed (e.g., by processor(s) 202), causes network element 200 to perform operations, which can include, but not be limited to: receiving packets; querying one or more data structures (e.g., any combination of CS 220, PIT 222, FIB 224, Face Table 226, Path Table 228, etc.); updating one or more data structures; encoding or decoding PSVs that may be tagged, appended or otherwise included with one or more packets; determining incoming faces for packets; determining outgoing faces for packets; forwarding packets; determining one or more change(s) to FIB 224; identifying one or more face(s) effected by the change(s); generating new temporary Face ID(s) for the corresponding face(s) and updating one or more corresponding entry/entries for the corresponding face(s) in the Face Table 226; combinations thereof; and/or any other operations as discussed for various embodiments described herein.

In at least one embodiment, control logic 214 can include instructions that, when executed, cause network element 200 to perform operations, which can include, but not be limited to, providing overall control operations of network element 200; cooperating with face management logic 212, forwarding logic 216; cooperating with consumer application(s) 230 (if provisioned); cooperating with producer application(s) 232 (if provisioned); maintaining and/or interacting with stored data, information, parameters, etc. (e.g., memory element(s), storage, data structures, databases, tables, etc.); combinations thereof; and/or the like to facilitate various operations as discussed for various embodiments described herein.

Referring to FIGS. 3A-3C, FIGS. 3A-3C are simplified schematic diagrams illustrating example details that can be associated with example data structures that can be provisioned for the example network element 200 of FIG. 2 in accordance with at least one embodiment of communication system 100.

Turning to FIG. 3A, FIG. 3A illustrates example details that can be associated with example Forwarding Information Base (FIB) 224 that may be maintained by network element 200 in accordance with at least one embodiment. As illustrated for the embodiment of FIG. 3A, FIB 224 can include a number of name-prefix entries 312 for a Name-Prefix array 310 and a corresponding number of face list entries 322 for a Face List array 320. Each of a corresponding name-prefix entry 312 is associated or otherwise linked to a corresponding face list entry 322 that identifies one or more face(s) to be used for forwarding Interest packets associated with the corresponding name-prefix entry. For example FIB 224, a name-prefix entry /com/Cisco can be associated with face entries Face ID 1 ($F_1$) and Face ID 2 ($F_2$) provisioned for network element 200 for forwarding Interest packets including the name-prefix /com/Cisco.

Turning to the FIG. 3B, FIG. 3B illustrates example details that can be associated with example Face Table 226 that may be maintained by network element 200 in accordance with at least one embodiment. As illustrated for the embodiment of FIG. 3B, Face Table 226 can include a number of Face ID entries 332 for a Face ID array 330, a corresponding number of temporary Face ID entries 342 for a temporary Face ID array 340 and a corresponding number of Face Attributes entries 352 for a face Attributes array 350. Each of a corresponding Face ID entry 332 is associated or otherwise linked to a corresponding temporary Face ID entry 342 and to a corresponding Face Attributes entry 352. Face attributes can include, but not limited to, status information (e.g., operational, uncongested, etc.), and/or any other face related information. For example, as shown in the embodiment of FIG. 3B, Face ID 1 is identified as being associated with a temporary Face ID of '997737' having face attributes that identify status information for the face and that the face is associated with an Ethernet zero (Eth0) face provisioned for network element 200. Further as shown in the embodiment of FIG. 3B, Face ID 2 is identified as being associated with a temporary Face ID of '55088' having face attributes that identify status information for the face and that the face is associated with an Ethernet 1 (Eth1) face provisioned for network element 200.

As discussed for various embodiments described herein, the temporary Face IDs for faces (e.g., Face 1 and Face 2) can change over the lifetime of each face. For example, if the name-prefix entry for/com/Cisco is removed or if one of Face 1 or Face 2 is removed from the Face List entry associated with the name-prefix, then a new random number can be generated for one or both effected Faces 1 and/or 2, whichever or both that may have been removed, and each associated temporary Face ID entry for each associated Face(s) can be updated in the Face Table 226.

Turning to FIG. 3C, FIG. 3C illustrates example details that can be associated with example PIT 222 that may be maintained by network element 200 in accordance with at least one embodiment. As illustrated for the embodiment of FIG. 3C, PIT 222 can include a number of name-prefix or Interest entries 362 for a name-prefix/Interest array 360, a corresponding number of incoming face list entries 372 for an incoming face list array 370, a corresponding number of outgoing face list entries 382 for an outgoing face list array 380, and a corresponding number of temporary Face list entries 392 for a temporary face list array 390. Each of a corresponding name-prefix/Interest entry 362 is associated or otherwise linked to: a corresponding incoming face list entry 372; a corresponding outgoing face list entry 382; and a corresponding temporary face list entry 392.

Name-prefix/Interest entries 362 can be used to identify pending Interests that have been received but not yet satisfied by the network element 200. Incoming face list entries 372 can be used to identify one or more incoming face(s) upon which an Interest has been received for a particular name-prefix from one or more consumer(s). Outgoing face list entries 382 can be used to identify one or more outgoing permanent face(s) upon which received Interest(s) have been forwarded upstream. Temporary face list entries 392 can be used to identify one or more temporary Face IDs for the permanent face(s) identified in a corresponding outgoing face list entry 382. For a first Interest received for a particular name-prefix, an entry is added to the PIT 222 and for subsequent Interest(s) received for the particular name-prefix, the entry is updated to reflect updated face information that may be associated with the subsequent Interest(s) for the same particular name-prefix. In this manner, network element 200 can track pending Interests that need to be satisfied with a reverse path Data packet.

The temporary face list array 390 is important to maintain in the PIT 222 because when route updates occur for a particular ICN forwarder (e.g., network element 200 configured as an ICN forwarder), it is possible that some Interests associated with a changed face may have already been forwarded upstream but corresponding Data packets have not yet passed back through the particular ICN forwarder. If the PIT is not updated when routes change, such in-transit Data packets would encode a PSV with a newly generated temporary Face ID. However, it is undesirable if a consumer starts using this new path because this new path no longer matches the current state of the routing plane. To prevent the discovery by a consumer endpoint of an invalid path, such in-flight Data packets can, in some embodiments, be dropped based on a mismatch of temporary Face ID(s) recorded in a corresponding PIT entry for an associated Interest to the newly generated temporary Face ID(s) of the face(s) upon which the in-flight Data packet(s) have been received. Alternatively, such Data packet(s) can, in other embodiments, be forwarded with the PSV removed or invalidated, which also avoids the reporting of an invalid path.

Referring to FIG. 4A, FIG. 4A is a simplified flow diagram illustrating example forward path operations that can be associated with network element 200 implemented as an ICN forwarder (e.g. any of ICN forwarders 104.1-104.4 and any other ICN forwarder that may be deployed for communication system 100) in accordance with at least one embodiment of the communication system 100. An Interest flow 402 (e.g., for an example Interest packet) is shown through network element 200 in an upstream direction from a consumer or a downstream ICN forwarder to a producer or upstream ICN forwarder.

When network element 200 receives an Interest packet, Content Store 220 is checked for matching data. If matching data is found, a Data packet can be returned on the face from which the interest packet was received and a PSV can be included in the Data packet, as discussed in further detail herein. If matching data is not found in Content Store 220, network element 200 can perform lookup on the PIT 222 using the name-prefix contained in the Interest packet. If a matching entry is found in the PIT 222, then the Interest is aggregated in a common PIT entry associated with the name-prefix and network element 200 records the incoming face upon which the Interest was received and does not forward the Interest upstream. If a matching entry for the Interest is not found in PIT 222, an entry for the Interest (e.g., a name-prefix entry, a corresponding incoming face list entry, a corresponding outgoing face list entry, and a corresponding temporary Face list entry) can be created in the PIT 222 and the network element 200 can determine whether an encoded temporary Face ID (e.g., a PSV TLV) is included with the Interest.

If no encoded temporary Face ID is included with the Interest, network element 200 can perform a lookup on the FIB 224 using the name-prefix for the Interest to attempt to determine outgoing face(s) upon which the Interest is to be forwarded. Based on an exact match or LPM using the name-prefix, the Interest can be forwarded upstream using corresponding face(s) identified in the FIB 224 for the exact match or LPM name-prefix and the network element can update its PIT 222 to include a list of one or more temporary Face ID(s) corresponding to any face(s) identified in the FIB 224. Otherwise, if no exact match or LPM is found for the Interest, it can be dropped or a NACK can be sent downstream to the requesting consumer.

However, if an encoded temporary Face ID is included with the Interest, network element 200 can decode the temporary Face ID and perform a lookup on Face Table 226 using the decoded temporary Face ID. In an embodiment in which temporary Face IDs are encoded into a PSV using a pairing function, the lookup on the Face Table 226 can be performed using one or both numbers decoded from the PSV. Based on a determination that a temporary Face ID is identified in the Face Table 226, the network element 200 updates its PIT 222 to identify the temporary Face ID associated with the Interest and forwards the Interest further upstream using an outgoing face associated with the temporary Face ID identified from the Table. Thus, FIB bypassing operations can be performed by ICN forwarder in order to forward the Interest upstream.

In an embodiment in which temporary Face IDs are encoded into a PSV using a pairing function, the decoded value from the Incoming interest that did not return a valid face ID from the Face Table 226 lookup can be used to update the PSV in a forwarded Interest. In an embodiment in which a PSV is encoded as a stack of labels, the stack can be popped to remove the topmost label from the stack before the Interest is forwarded further upstream.

If no match is found in Face Table 226 for the decoded temporary Face ID, the network element 200 can either perform a full FIB 224 lookup using the name-prefix for the Interest and update its PIT 222, as discussed above, or can perform one of: sending a NACK downstream to the requesting consumer rather than forwarding the Interest or dropping the Interest.

Referring to FIG. 4B, FIG. 4B is a simplified flow diagram illustrating example reverse path operations that can be associated with network element 200 implemented as an ICN forwarder (e.g. any of ICN forwarders 104.1-104.4 and any other ICN forwarder that may be deployed for communication system 100) in accordance with at least one embodiment of the communication system 100. A Content flow 404*a* (e.g., for an example Data packet) and a NACK flow 404*b* (e.g., for an example Interest-Return packet) are shown through network element in a downstream direction from a producer or an upstream ICN forwarder to a consumer or downstream ICN forwarder.

When network element 200 receives a Data packet or a NACK packet, which could have resulted from a failed Face Table lookup or a failed FIB lookup depending on implementation, the network element encodes a new temporary Face ID, includes the encoded temporary Face ID with the packet and performs a lookup on PIT 222 to determine whether the name-prefix contained in the packet is identified in the PIT 222 and whether a temporary Face ID identified in the PIT 222 matches the temporary Face ID associated with the face upon which the Data packet was received. If either lookup fails, the network element 200 can perform one or more error handling operations. However, if both lookups succeed, the network element 200 caches the content in its Content Store 220 and forwards the packet further downstream using the face(s) identified in the incoming face list entry associated with the name-prefix.

In various embodiments, Data or NACK packet error handling operations can be configured for a network element (e.g., network element 200) such that if either PIT lookup fails, the network element can, depending on configuration by a network operator and/or service provider, perform operations including any of: (1) dropping the Data or NACK packet; (2) clearing out the Data or NACK packet PSV and forwarding the packet downstream with no PSV; (3) encoding the Data or NACK packet PSV using an old temporary Face ID identified in the PIT that was previously valid but is no longer valid; or (4) performing a FIB lookup on the name-prefix included in the Data or NACK packet to determine whether the face is still a valid choice for Interest packet forwarding for the name-prefix, in which case a new temporary Face ID for the corresponding face could be encoded into the PSV for the packet.

Different tradeoffs can be considered for different error handling operations. For example, dropping a Data or NACK packet can provide a robust solution for error handling but can hurt overall performance. Clearing out a Data or NACK packet PSV and forwarding the packet downstream with no PSV might be confusing to a consumer application, because the consumer application might associate the Data packet with a new path. Encoding a Data or NACK packet PSV using an old temporary Face ID identified in the PIT that was previously valid but is no longer valid can also provide a robust solution for error handling but can cause a time delayed (e.g., 1RTT) performance hit. Performing a FIB lookup on the name-prefix included in a Data or NACK packet to determine whether the face is still a valid choice for Interest packet forwarding for the name-prefix and encoding a new temporary Face ID for the corresponding face into the PSV for the Data packet might increase processing time at a forwarder. Thus, error handling operations can be configured for network elements depending on various needs and/or implementations.

Figure 5:
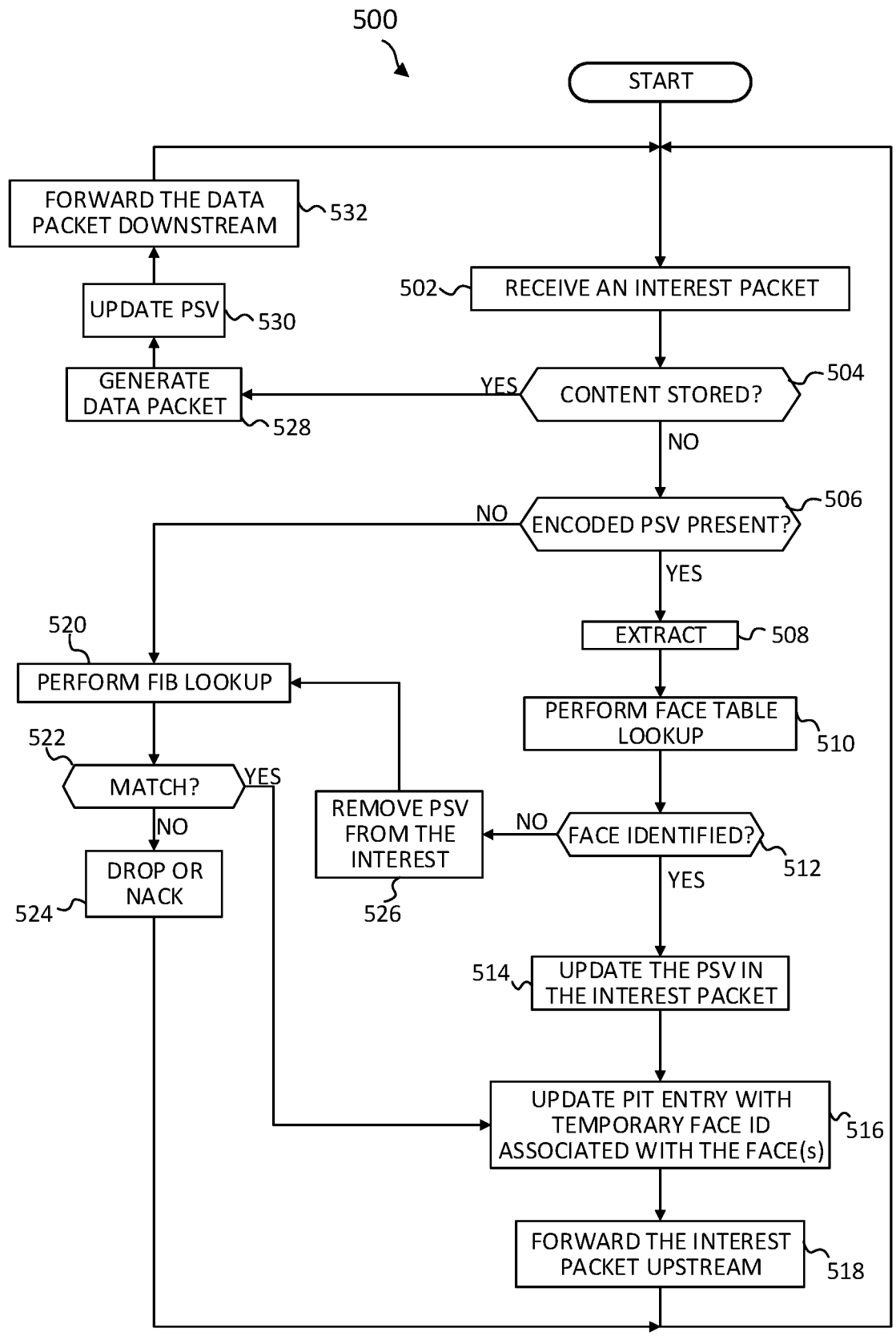
FIG. 5 is a simplified flow diagram illustrating example operations that can be associated with Interest packet forwarding in accordance with at least one embodiment of the communication system.

Referring to FIG. 5, FIG. 5 is a simplified flow diagram illustrating example operations 500 that can be associated with FIB-bypassing Interest packet forwarding in accordance with at least one embodiment of communication system 100. In various embodiments, operations 500 can be performed by network element 200 implemented as an ICN forwarder (e.g. any of ICN forwarders 104.1-104.4 and any other ICN forwarder that may be deployed for communication system 100).

At any time, a given ICN forwarder can receive (502) an Interest packet from a downstream source (e.g., from a consumer or a downstream ICN forwarder) that identifies a content name (e.g., a name-prefix) requested by a consumer. At 504, the ICN forwarder can determine whether it has content stored in its Content Store that is identified by the name-prefix contained in the Interest packet. Based on a determination at 504, that the ICN forwarder does not have the content stored in its Content Store, the operations continue to 506. At 506, the ICN forwarder can determine whether an encoded PSV is present for the Interest packet. Based on a determination that an encoded is present for the Interest, the ICN forwarder can extract (508) the PSV (e.g., by decoding a PSV using a pairing function or by extracting information from a label on a label stack). At 510, the ICN forwarder can perform a lookup on its Face Table based on the decoding. At 512, the ICN forwarder determines, whether a face (e.g., a permanent Face ID) is identified in the Face Table based on the lookup (e.g., whether a temporary Face ID from the decoded PSV is identified in the Face Table). In some embodiments, the operations at 510 and 512 can be performed using one or both numbers decoded from a PSV included in an Interest packet that was decoded using a pairing function. In other embodiments, the operations at 510 and 512 can be performed using a temporary Face ID for a label popped from a label stack contained in a PSV included in an Interest packet.

Based on a determination that a face is identified in the Face Table following the Face Table lookup, the ICN forwarder updates the PSV (514) and updates its PIT (516) (e.g., to include a new name-prefix entry or to update an existing entry for the name-prefix) with the temporary Face ID associated with the outgoing face. At 518, the ICN forwarder forwards the Interest packet further upstream using the face identified from the Face Table lookup and the operations return to 502 to await another Interest packet being received.

For embodiments in which temporary Face IDs are encoded into a PSV using a pairing function, updating an outgoing PSV at 514 for an outgoing Interest packet can include updating the PSV to include one of the two decoded numbers recovered from a PSV in a received Interest. For example, in some embodiments, the updating at 514 can include updating an outgoing PSV using the decoded number that did not result in a face being identified in the Face Table. In other embodiments, the updating at 514 can include updating an outgoing PSV using the number decoded from the incoming PSV that was larger or based on any other relationship that may be realized for a particular pairing function. For some embodiments in which temporary Face IDs are encoded into labels for a label stack contained in a PSV, the updating at 514 can include popping or otherwise removed a topmost label from the stack.

Recalling the operations at 506, based on a determination that no encoded temporary Face ID is present for the Interest, the ICN forwarder can perform lookup on its FIB at 520 using the name-prefix contained in the Interest packet. At 522, the ICN forwarder determines whether there is a match (e.g., exact or LPM) in the FIB based on the name-prefix contained in the Interest. Based on a determination that there is a match, the operations continue to 516 at which the ICN forwarder updates its PIT to include temporary Face ID(s) for any face(s) identified for the FIB entry and the operations continue to 518 at which the ICN forwarder forwards the Interest packet further upstream according to the permanent Face ID(s) identified in the FIB entry for the FIB lookup. Based on a determination that there is not a match, the ICN forwarder can drop or NACK the Interest packet at 524 and the operations can return to 502 to await another Interest packet being received. The determination of whether to NACK or drop the Interest can be configured by a network operator and/or service provider based on various needs and/or implementations.

Recalling the operations at 512, based on a determination that no face is identified in the Face Table following a failed temporary Face ID lookup on the Face Table, the operations can continue to 524 at which the ICN forwarder removes the PSV from the Interest and the operations continue to 520 in which a full FIB lookup is performed as described above.

Recalling the operations at 504, based on a determination that content identified in the Interest packet is stored in the Content Store of the ICN forwarder, the operations can continue to 528 at which the ICN forwarder generates a data packet including the requested content. At 530, the ICN forwarder updates the PSV for the Data packet. At 532, the ICN forwarder forwards the Data packet back downstream towards the consumer that requested the content and the operations can return to 502 to await another Interest packet being received.

Updating the PSV at 530 can be performed through different operations depending on needs and implementations. For example, in some embodiments, the updating at 530 can involve including a PSV in the Data packet using the PSV that was included in the received Interest packet. While this solution will enable the Data packet PSV to be matched with an Interest PSV, the Data packet PSV can be misleading as it may not reflect the path that the content took to reach a consumer that requested the content (e.g., the Data packet PSV may not include additional upstream hops that a previous Data packet (that contained the content that is stored at the ICN forwarder) took when it was sent to a first consumer that requested the content).

In other embodiments, the updating at 530 can involve including a 'partial path' PSV in the Data packet such that the partial path PSV represents a path including one or more upstream hops for which a previous Data packet (that contained the content that is stored at the ICN forwarder) took to reach the ICN forwarder at which the content is stored. In such embodiments, ICN forwarders within an ICN network can be configured to store such partial path PSVs received in Data packets in association with content stored the Content Store of each ICN forwarder. In still other embodiments, the updating at 530 can involve including additional information in a PSV for an outgoing Data packet and the PSV and additional information can be used to update the PSV.

Accordingly, as illustrated for the embodiment of FIG. 5, FIB-bypassing operations can be performed by an ICN forwarder in accordance with at least one embodiment of communication system 100. It should be understood that implementations of operations 500 can be modified, changed, or re-ordered in any manner depending on needs and implementations without departing from the scope of the discussed concepts. For instance, in some embodiments, it may be beneficial to provisionally change the PSV in a packet in a way that could be backed out. Further, in some embodiments, if error handling was to remove a PSV, then an algorithm can be determined such that removal of the PSV wouldn't be harmful for cases in which the PSV is first changed to an incorrect value and then later removed based on some error condition. Other operations can be envisioned depending on needs and implementations.

Figure 6:
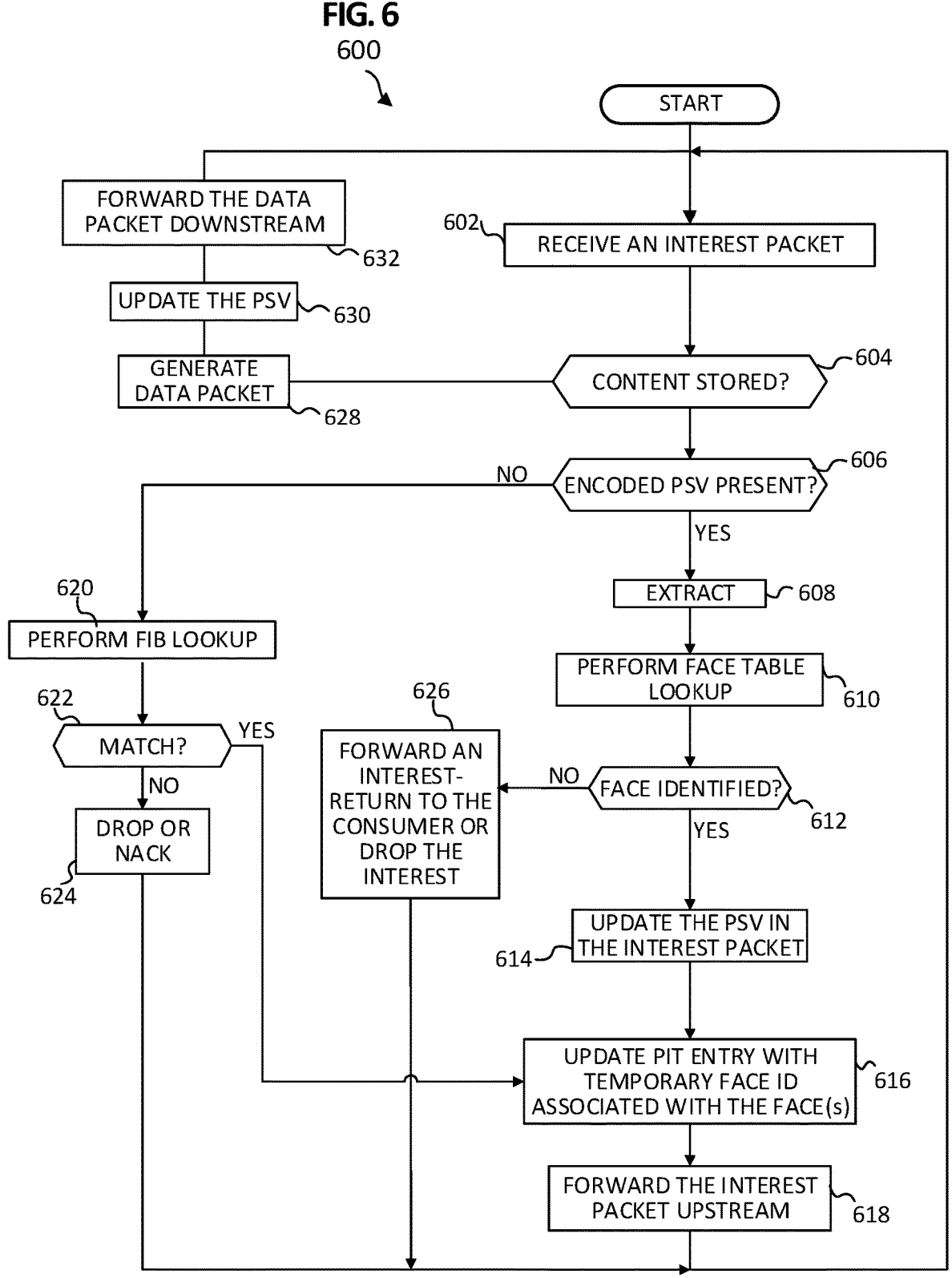
FIG. 6 is a simplified flow diagram illustrating other example operations that can be associated with Interest packet forwarding in accordance with at least one embodiment of the communication system.

Referring to FIG. 6, FIG. 6 is a simplified flow diagram illustrating other example operations 600 that can be associated with FIB-bypassing Interest packet forwarding in accordance with at least one embodiment of communication system 100. In various embodiments, operations 600 can be performed by network element 200 implemented as an ICN forwarder (e.g. any of ICN forwarders 104.1-104.4 and any other ICN forwarder that may be deployed for communication system 100).

Respective operations performed at 602, 604, 606, 608, 614, 616, 618, 620, 622, 624, 628, 630, and 632 can be performed the same as respective operations 502, 504, 506, 508, 514, 516, 518, 520, 522, 524, 528, 530, and 532 as discussed above for the embodiment of FIG. 5. However, for the embodiment of FIG. 6 at 612, based on a determination that no face is identified in the Face Table following a failed temporary Face ID lookup on the Face Table, the operations can continue to 626 at which the ICN forwarder either: generates and sends a NACK (e.g., an Interest-Return) packet back downstream towards the consumer that initiated the content request rather than forwarding the Interest and the operations can return to 602; or the ICN forwarder drops the Interest and the operations can return to 602 to await another Interest packet being received. The determination of whether to NACK or drop the Interest can be configured by a network operator and/or service provider for an ICN network.

In at least one embodiment, the NACK can include an 'Invalid_Path' indication (e.g., a flag, subcode, bit, byte, etc. set in for an Interest-Return packet), which can indicate to the consumer that it needs to update its Path Table accordingly. Accordingly, as illustrated for the embodiment of FIG. 6, other FIB-bypassing operations can be performed by an ICN forwarder in accordance with at least one embodiment of communication system 100. In various embodiments, network elements for an ICN network can be configured by a network operator and/or service provider to perform operations as shown in the embodiments of FIGS. 5 and 6 based on various needs and/or implementations.

Figure 7:
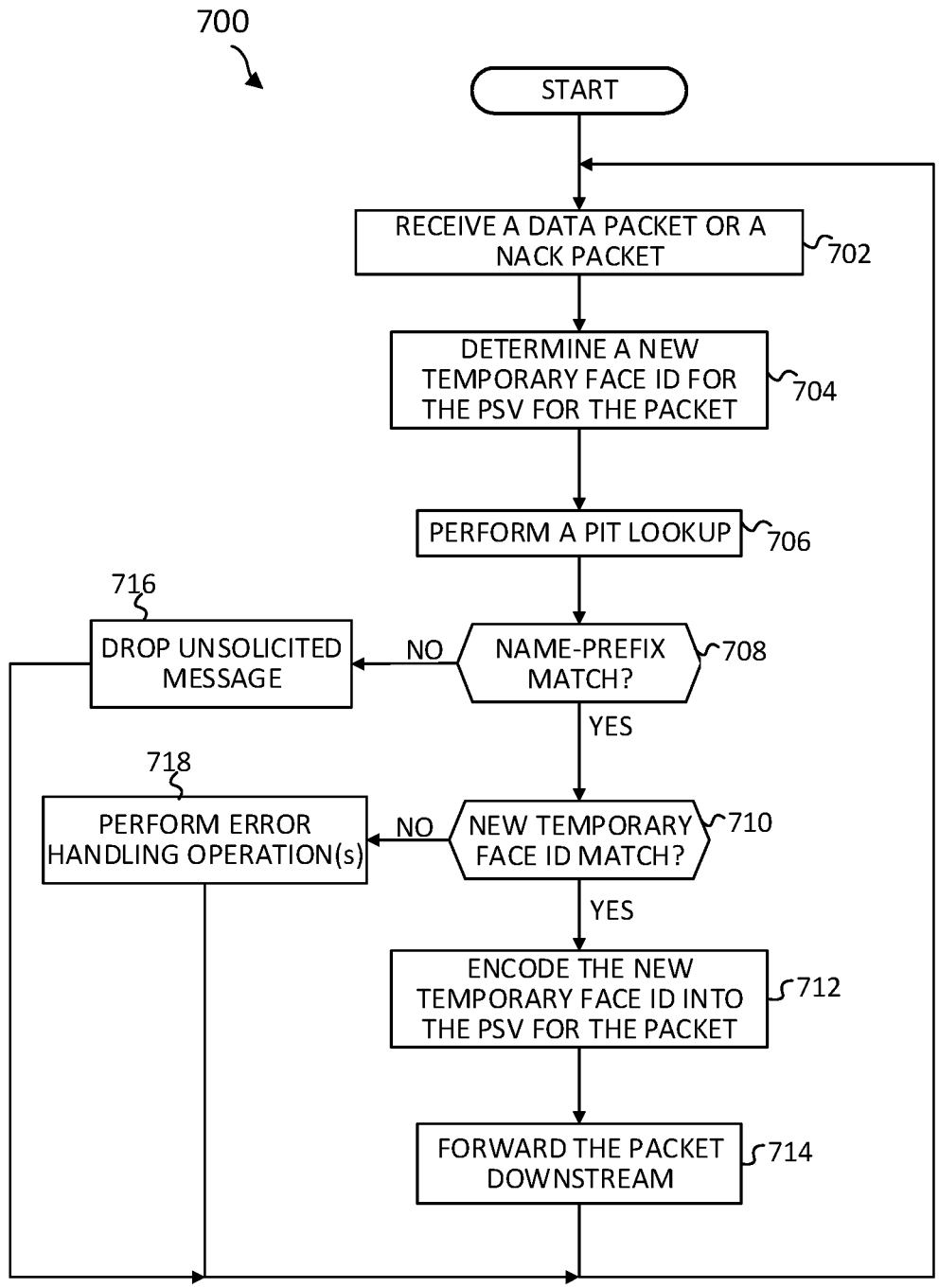
FIG. 7 is a simplified flow diagram illustrating example operations that can be associated with Data packet forwarding in accordance with at least one embodiment of the communication system.

Referring to FIG. 7, FIG. 7 is a simplified flow diagram illustrating example operations 700 that can be associated with Data packet forwarding in accordance with at least one embodiment of communication system 100. In various embodiments, operations 700 can be performed by network element 200 implemented as an ICN forwarder (e.g. any of ICN forwarders 104.1-104.4 and any other ICN forwarder that may be deployed for communication system 100).

At any time, a given ICN forwarder can receive (702) a Data or a NACK packet from an upstream source (e.g., an upstream ICN forwarder or a producer) that identifies a content name (e.g., a name-prefix) requested by a consumer. At 704, the ICN forwarder determines a new temporary Face ID that may be encoded into the PSV for the packet based on the face upon which the packet was received by the forwarder. At 706, the ICN forwarder can perform a lookup on its PIT using a name-prefix contained in the packet. At 708, the ICN forwarder determines whether a name-prefix match exists in the PIT for the name-prefix contained in the packet and name-prefix entries stored in the PIT.

Based on a determination at 708 that a name-prefix match exists in the PIT, the ICN forwarder determines at 710 whether an existing temporary Face ID associated with the name-prefix entry in the PIT matches the temporary Face ID associated with the face upon which the packet was received by the forwarder. Based on a determination at 710 that an existing temporary Face ID associated with the name-prefix entry in the PIT matches the temporary Face ID associated with the face upon which the packet was received, the ICN encodes (712) the new temporary Face ID into the PSV for the packet and forwards (714) the packet that includes the encoded PSV further downstream using the face(s) identified in the PIT and the operations can return to 702 at which the ICN forwarder waits for another Data packet to be received.

Based on a determination at 708 that no name-prefix match exists in the PIT the ICN forwarder determines that the Data or NACK packet is an unsolicited message and the ICN forwarder drops (716) the unsolicited message and the operations can return to 702 at which the ICN forwarder awaits another Data or NACK packet to be received. Based on a determination at 710 that the temporary Face ID associated with the face upon which the packet was received by the forwarder does not match a temporary Face ID associated with the name-prefix entry, the ICN forwarder performs one or more error handling operation(s) (718) on the packet and the operations can return to 702 at which the ICN forwarder waits for another Data or NACK packet to be received.

In various embodiments, as noted previously, Data or NACK packet error handling operations can be configured for an ICN forwarder such that if either PIT lookup fails, the ICN forwarder can, depending on configuration by a network operator and/or service provider, perform operations including any of: (1) dropping the Data or NACK packet; (2) clearing out the Data or NACK packet PSV and forwarding the packet downstream with no PSV; (3) encoding the Data or NACK packet PSV using an old temporary Face ID identified in the PIT that was previously valid but is no longer valid; or (4) performing a FIB lookup on the name-prefix included in the Data or NACK packet to determine whether the face is still a valid choice for Interest packet forwarding for the name-prefix, in which case a new temporary Face ID for the corresponding face could be encoded into the PSV for the packet.

Figure 8:
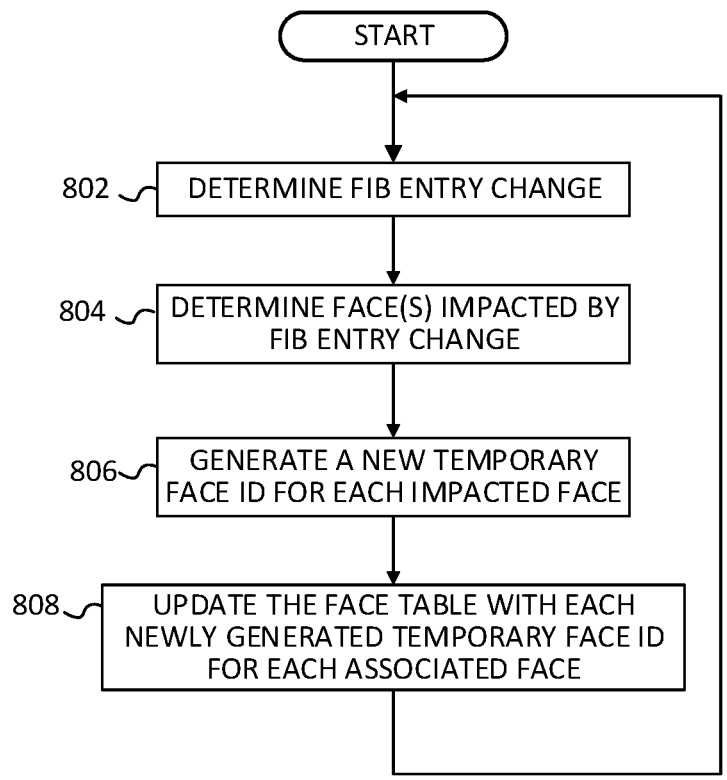
FIG. 8 is a simplified flow diagram illustrating example operations that can be associated with data structure management accordance with at least one embodiment of the communication system.

Referring to FIG. 8, FIG. 8 is a simplified flow diagram illustrating example operations 800 that can be associated with Face Table management operations in accordance with at least one embodiment of communication system 100. In various embodiments, operations 800 can be performed by network element 200 implemented as an ICN forwarder (e.g. any of ICN forwarders 104.1-104.4 and any other ICN forwarder that may be deployed for communication system 100).

At 802, the ICN forwarder determines that a change to a FIB entry has occurred. In various embodiments, the change can include a name-prefix entry being removed from the FIB and/or one or more Face IDs being removed from the FIB entry. At 804, the ICN forwarder determines face(s) impacted by the changed FIB entry (e.g., face(s) impacted by a removed FIB entry or face(s) removed from a FIB entry). At 806, the ICN forwarder generates a new temporary Face ID for each impacted face. At 808, the ICN forwarder updates its Face Table with each newly generated temporary Face ID for each impacted face and the operations can return to 802 at which the ICN forwarder can determine whether any more FIB entries changes have occurred.

Accordingly, through renumbering faces using temporary Face IDs, the system and method provided by communication system 100 provides for the ability to; a) forward Interest messages in an ongoing data transfer without performing costly FIB lookups; and/or b) instantaneously react to the changes in the FIB (e.g. route deletion) and therefore avoid incorrect routing of packets. Various advantages can be realized using the system and method provided by communication system 100 in accordance with various embodiments which can include, but not be limited to, providing for a straightforward implementation of FIB-bypassing operations that can reduce average latency and increase average throughput through ICN forwarders.

Referring to FIG. 9, FIG. 9 is a simplified flow diagram illustrating example operations 900 that can be associated with a consumer node in accordance with at least one embodiment of communication system 100. In particular, operations 900 can be associated with maintaining a Path Table (e.g., Path Table 228) by network element 200 that is provisioned with one or more consumer application(s) (e.g. consumer application(s) 230).

At any time, the network element 200 can receive (902) a packet. At 904, the network element can determine whether the received packet is a Data packet. Based on a determination at 904 that the received packet is a Data packet, the network element can update (906) its Path Table to store a name-prefix entry associated with the name-prefix contained in the Data packet (e.g., different levels of name-prefix granularity can be stored in the Path Table depending on needs and implementations) and to store an encoded PSV (e.g., a PSV encoded using a pairing function, a PSV encoded as a label stack, etc.) that is linked to the stored name-prefix. The operations can then return to 902 at which the network element waits for another packet to be received.

Based on a determination at 904 that the received packet is not a Data packet, the network element determines at 908 whether the received packet is a NACK (e.g., an Interest-Return) packet that indicates that indicates an invalid path. Based on a determination at 908 that the received packet is a NACK packet that indicates an invalid path, the network element can update (910) its Path Table to remove name-prefix entry and an encoded PSV from the Path Table for the name-prefix entry that is associated with the name-prefix contained in the NACK packet and the operations can then return to 902 at which the network element waits for another packet to be received.

Based on a determination at 908 that the received packet is not a NACK packet, operations can continue to 912 at which the network element can perform further packet processing operations on the packet following which the operations can then return to 902 at which the network element waits for another packet to be received. In some embodiments, it can be envisioned that other NACK packets indicating other information may be used to trigger removal of a PSV from the Path Table depending on needs and implementations.

Referring to FIG. 10A, FIG. 10A is a simplified schematic diagram illustrating example details that can be associated with an example Interest packet 1000 that can support FIB-bypassing operations in accordance with at least one embodiment of communication system 100. Interest packet 1000 can include a PSV TLV 1002 and a content name 1004 that includes a name-prefix identifying content requested by a consumer. In some embodiments, Interest packet 1000 can further include an optional ICN header 1006 and one or more optional TLVs 1008.

In various embodiments, PSV TLV 1002 can be encoded as a single value 1014 generated using a pairing function or can be encoded as a label stack 1016 that can include an 'N' number of labels 1018.1-1018.N such that each label 1018.1-1018.N contains a temporary Face ID associated with each of 1-N hops that the packet is to traverse toward a given content source.

In some embodiments, optional ICN header 1006 can include information such as, for example, version information, packet length information, hop limit information, flags, message type information or other information as may be defined by standards. In some embodiments, optional TLVs 1008 can include information such as, for example, an interest lifetime, which can indicate a lifetime for how long an Interest may be stored in the PIT, one or more selectors that can be used to facilitate PIT lookups, a nonce that can be used along with the name-prefix to uniquely identify the Interest packet, a validation algorithm, a validation payload, metadata elements, combinations thereof, or the like. In still some embodiments, PSV TLV 1002 can be included in the optional ICN header 1006.

Referring to FIG. 10B, FIG. 10B is a simplified schematic diagram illustrating example details that can be associated with an example Data packet 1050 that can support FIB-bypassing operations in accordance with at least one embodiment of communication system 100. Data packet 1050 can include a PSV TLV 1052, a content name 1054 that includes a name-prefix identifying content requested by a consumer, and the requested content 1056.

In various embodiments, PSV TLV 1052 can be encoded as a single value 1064 generated using a pairing function or can be encoded as a label stack 1066 that can include an 'N' number of labels 1068.1-1068.N such that each label 1068.1-1068.N contains a temporary Face ID associated with each of 1-N hops that the packet is to traverse toward the consumer that requested the content.

In some embodiments, Data packet 1050 can further include an optional ICN header 1058 and/or one or more optional TLVs 1060. In some embodiments, optional ICN header 1058 can include information such as, for example, version information, packet length information, hop limit information, flags, message type information or other information as may be defined by standards. In some embodiments, one or more optional TLVs 1060 can include a signature for a publisher of the content that is used to digitally sign the published content, a validation algorithm, a validation payload, metadata elements, combinations thereof, or the like. In still some embodiments, PSV TLV 1052 can be included in the optional ICN header 1058.

Variations and Implementations

In regards to the internal structure associated with communication system 100, appropriate software, hardware and/or algorithms are being provisioned for network elements within communication system 100 in order to facilitate FIB-bypassing Interest packet forwarding operations in a network environment as discussed for various embodiments described herein.

The terms 'network element', 'node', 'forwarder', 'router' or variations thereof can be inclusive of devices used to initiate and/or respond to communications (e.g., Interest packets, Data packets, etc.) in a network, such as a computer, an electronic device such as an (IoT) device (e.g., an appliance, a thermostat, a sensor, a parking meter, etc.), a personal digital assistant (PDA), a laptop or electronic notebook, a gaming system, a vehicle infotainment system, a smart television, a cellular telephone, an IP phone, an electronic device having cellular and/or Wi-Fi connection capabilities, a wearable electronic device or any other device, component, element, or object capable of initiating voice, audio, video, media, or data exchanges within communication system 100. A network element (e.g., node, forwarder, router, etc.) may also be inclusive of a suitable interface to a human user such as a microphone, a display, a keyboard, or other terminal equipment.

A network element may also be any device that seeks to initiate a communication on behalf of another entity or element such as a program, application, a database, or any other component, device, element, or object capable of initiating an exchange within communication system 100. Within communication system 100, IP addresses, if used, can be assigned using Dynamic Host Configuration Protocol (DHCP), Stateless Address Auto-configuration (SLAAC), ICN control-plane protocols, or any suitable variation thereof. IP addresses, if used within communication system 100, can include IP version 4 (IPv4) and/or IPv6 addresses.

In at least some embodiments, consumer node 102 and/or producer node 106, can be associated with users that communicate in communication system 100 via ICN network 110. In other embodiments, consumer node 102 and/or producer node 106 may facilitate data exchanges via ICN network 110 while operating independently of user interactions. Although various functions are described herein as relating to either a consumer node or a producer node, it should be apparent that a node could be configured to act as both a consumer and a producer content node. For example, in some embodiments, a producer node can be a consumer in itself and/or a consumer node can be a producer node. For example, a video conference call established over ICN network 110 could include nodes associated with respective users, which can be configured to act as both producers and consumers of video content produced for the call. Thus, elements of consumer node 102 and producer node 106 may be provisioned in any suitable arrangement or configuration to achieve the operational features of a consumer node, a producer node, or a suitable combination thereof.

Communication system 100 can include one or more networks, such as ICN network 110, which can represent a series of points or network elements of interconnected communication paths for receiving and transmitting messages (e.g., packets of information) that propagate through the one or more networks. These network elements offer communicative interfaces and faces that facilitate communications between the network elements. A network, such as ICN network 110, can comprise any number of hardware and/or software elements coupled to (and in communication with) each other through a communication medium. Such networks can include, but are not limited to, any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment or any suitable combination thereof.

Networks through which communications propagate in communication system 100 can use any suitable technologies for communication including wireless (e.g., 3G/4G/5G/nG network, Institute of Electrical and Electronics Engineers (IEEE) Std 802.11™-2012, published Mar. 29, 2012, WiMAX, IEEE Std 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, Fibre Channel, etc.) communication. Generally, any suitable means of communication may be used such as electric, sound, light, infrared, and/or radio.

Communications in a network environment can be referred to herein as 'messages', 'messaging', 'signaling', 'data', 'content', 'Interest' 'objects', 'requests', 'queries', 'responses', 'replies', etc. which may be inclusive of packets. Generally, signaling is referred to in reference to control-plane or management-plane packets while messaging can be referred to in reference to control-plane, management-plane, or data-plane packets exchanged for communications at the application level.

A packet is a formatted unit of data and can contain both control information (e.g., source and destination address, etc.) and data, which is also known as a payload. In some embodiments, control information can be included in headers and trailers for packets. Messages can be sent and received according to any suitable communication protocols. Suitable communication protocols can include a multi-layered scheme such as the Open Systems Interconnection (OSI) Model, or any derivations or variants thereof.

The terms 'data', 'information', 'content', 'parameters' and variations thereof as used herein can refer to any type of binary, numeric, voice, video, textual, photographic or script data or information or any type of source or object code, or any other suitable data or information in any appropriate format that can be communicated from one point to another using electronic systems (e.g., servers, nodes, routers, forwarders, network elements, computing devices, compute nodes, client nodes, source nodes, consumer nodes, producer nodes, etc.) and/or networks.

In various embodiments, communication system 100 may implement User Datagram Protocol/Internet Protocol (UDP/IP) connections and/or Transmission Control Protocol/IP (TCP/IP) connections in particular embodiments of the present disclosure. However, communication system 100 can alternatively implement any other suitable communication protocol, interface, face and/or standard, proprietary and/or non-proprietary, for transmitting and receiving messaging and/or signaling.

In various example implementations, network elements (e.g., ICN forwarders, consumer nodes and/or producer nodes) discussed for various embodiments described herein can encompass network elements such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various FIB-bypassing operations in a network environment (e.g., for networks such as those illustrated in FIG. 1) as described for various embodiments discussed herein. In various embodiments, one or more of the content nodes, producer nodes, and/or ICN forwarders discussed herein can include software (or reciprocating software) that can coordinate in order to achieve operations associated with providing FIB-bypassing Interest forwarding in a network environment as discussed herein and may include any suitable algorithms, hardware, software, components, modules, logic, clients, interfaces, faces, and/or objects that facilitate the operations thereof. This may be inclusive of appropriate algorithms, communication protocols, interfaces, faces, and/ or standards, proprietary and/or non-proprietary, that allow for the effective exchange of data or information.

In various embodiments, ICN forwarders, consumer nodes, and/or producer nodes as discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to one or more of ICN forwarders, a consumer node and/or a producer node discussed herein could be provided in any database, table, register, control list, cache, data structure, storage, and/or storage structure: all of which can be referenced at any suitable timeframe. Any such storage options may also be included within the broad term 'memory element' as used herein. Any of potential processing elements, controllers, managers, logic, and/or machines described herein can be construed as being encompassed within the broad term 'processor'. In various embodiments, ICN forwarders, consumer nodes, and/or producer nodes discussed herein can also include suitable interfaces and faces for receiving, transmitting, and/or otherwise communicating data or information in a network environment.

Note that in certain example implementations, operations as outlined herein to facilitate FIB-bypassing Interest forwarding in a network environment may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage [as shown in FIG. 2 can store data, software, code, instructions (e.g., processor instructions), logic, parameters, combinations thereof or the like used for operations described herein. This includes memory elements and/or storage being able to store data, software, code, instructions (e.g., processor instructions), logic, parameters, combinations thereof, or the like that are executed to carry out operations described herein.

A processor (e.g., a hardware processor) can execute any type of instructions associated with data to achieve the operations detailed herein. In one example, a processor [as shown in FIG. 2] can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor), and/or one or more the elements identified herein could be some type of a programmable processor, programmable digital logic (e.g., a field programmable gate array (FPGA), a DSP processor, an EPROM, a controller, an electrically erasable PROM (EEPROM), or an ASIC that includes digital logic, software, code, electronic instructions, or any suitable combination thereof.

Note that in this Specification, references to various features (e.g., elements, structures, nodes, modules, components, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein this Specification, can be inclusive of an executable file comprising instructions that can be understood and processed on a computer, processor, machine, compute node, combinations thereof, or the like and may further include library modules loaded during execution, object files, system files, hardware logic, software logic, and/or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interactions may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces, faces, and protocols, communication system 100 may be applicable to other exchanges or routing protocols, interfaces, faces, and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (1) does not intend any of the appended claims to invoke paragraph (f) of 35 U.S.C. Section 112 as it exists on the date of the filing hereof unless the words "means for" or "step for" are specifically used in the particular claims; and (2) does not intend, by any statement in the specification, to limit this disclosure in any way that is not otherwise reflected in the appended claims.

What is claimed is:

1. A method comprising:
   receiving an interest packet at a network element in an information-centric network, wherein the interest packet identifies content requested by a consumer;
   determining whether a temporary face identifier (ID) contained in the interest packet is stored at the network element;
   in response to determining that the temporary face ID is stored at the network element, determining a face of the network element based on the temporary face ID, wherein the face is an interface of the network element and includes at least one attribute; and
   based on a determination of the face, forwarding the interest packet to another network element without referencing a forwarding information base stored by the network element, wherein the temporary face ID and a permanent face ID identify the face of the network element connected to the another network element, and the temporary face ID is different from the permanent face ID,
   wherein the permanent face ID is stable over a lifetime of the face and the temporary face ID changes over the lifetime of the face based at least in part on a changed entry in the forwarding information base.

2. The method of claim 1, further comprising:
   determining whether a content name associated with the content is stored at the network element based on a determination that the temporary face ID is not stored at the network element; and
   forwarding the interest packet to the another network element based on a determination that the content name is stored at the network element.

3. The method of claim 2, further comprising:
   performing one of dropping the interest packet or sending a negative acknowledgement toward the consumer that requested the content rather than forwarding the interest packet based on a determination that the content name is not stored at the network element.

4. The method of claim 1, further comprising one of:
   sending a negative acknowledgement (NACK) to the consumer rather than forwarding the interest packet based on a determination that the temporary face ID is not stored at the network element; or
   dropping the interest packet based on a determination that the temporary face ID is not stored at the network element.

5. The method of claim 1, further comprising:
   determining the changed entry for the forwarding information base stored by the network element;
   determining one or more respective faces impacted by the changed entry;
   generating a respective new temporary face ID for each respective face impacted by the changed entry; and
   replacing a respective previously stored temporary face ID for each respective face with the respective new temporary face ID for each respective face.

6. The method of claim 1, further comprising:
   receiving a data packet at the network element, wherein the data packet identifies content requested by at least one consumer; and
   encoding a new temporary face ID into the data packet based on a particular face upon which the data packet was received by the network element.

7. The method of claim 6, further comprising:
   performing a content name lookup on a Pending Interest Table (PIT) stored at the network element to determine whether a content name included in the data packet matches a content name stored in the PIT;
   based on a determination that the content name included in the data packet matches a content name stored in a PIT entry of the PIT, performing a temporary face ID lookup on the PIT entry to determine whether the new temporary face ID matches a temporary face ID stored for the PIT entry;
   caching content contained in the data packet and forwarding the data packet to the another network element based on a determination that both the content name lookup and the temporary face ID lookup succeed; and
   performing one or more error handling operations based on a determination that the temporary face ID lookup fails.

8. The method of claim 6, wherein the encoding further comprises one of:
   adding a label to a label stack for the data packet, wherein the label includes the new temporary face ID; or
   generating a value using the new temporary face ID and another value contained in the data packet.

9. One or more non-transitory tangible media encoding logic that includes instructions for execution by a processor, wherein the execution causes the processor to perform operations, comprising:
   receiving an interest packet at a network element in an information-centric network, wherein the interest packet identifies content requested by a consumer;
   determining whether a temporary face identifier (ID) contained in the interest packet is stored at the network element;
   in response to determining that the temporary face ID is stored at the network element, determining a face of the network element based on the temporary face ID, wherein the face is an interface of the network element and includes at least one attribute; and based on a determination of the face, forwarding the interest packet to another network element without referencing a forwarding information base stored by the network element, wherein the temporary face ID and a permanent face ID identify the face of the network element connected to the another network element, and the temporary face ID is different from the permanent face ID, wherein the permanent face ID is stable over a lifetime of the face and the temporary face ID changes over the lifetime of the face based at least in part on a changed entry in the forwarding information base.

10. The media of claim 9, wherein the execution causes the processor to perform further operations, comprising:

determining whether a content name associated with the content is stored at the network element based on a determination that the temporary face ID is not stored at the network element; and forwarding the interest packet to the another network element based on a determination that the content name is stored in the forwarding information base for the network element.

11. The media of claim 10, wherein the execution causes the processor to perform further operations, comprising:

performing one of dropping the interest packet or sending a negative acknowledgement toward the consumer that requested the content rather than forwarding based on a determination that the content name is not stored in the forwarding information base for the network element.

12. The media of claim 9, wherein the execution causes the processor to perform further operations, comprising one of:

sending a negative acknowledgement (NACK) to the consumer rather than forwarding the interest packet based on a determination that the temporary face ID is not stored at the network element; or dropping the interest packet based on a determination that the temporary face ID is not stored at the network element.

13. The media of claim 9, wherein the execution causes the processor to perform further operations, comprising:

storing the temporary face ID in a Pending Interest Table (PIT) entry associated with the content based on a determination that the temporary face ID is stored at the network element.

14. The media of claim 9, wherein the execution causes the processor to perform further operations, comprising:

determining the changed entry for the forwarding information base stored by the network element;

determining one or more respective faces impacted by the changed entry;

generating a respective new temporary face ID for each respective face impacted by the changed entry; and replacing a respective previously stored temporary face ID for each respective face with the respective new temporary face ID for each respective face.

15. The media of claim 9, wherein the execution causes the processor to perform further operations, comprising:

receiving a data packet at the network element, wherein the data packet identifies content requested by at least one consumer; and encoding a new temporary face ID into the data packet based on a particular face upon which the data packet was received by the network element.

16. The media of claim 15, further comprising:

performing a content name lookup on a Pending Interest Table (PIT) stored at the network element to determine whether a content name included in the data packet matches a content name stored in the PIT;

based on a determination that the content name included in the data packet matches a content name stored in a PIT entry of the PIT, performing a temporary face ID lookup on the PIT entry to determine whether the new temporary face ID matches a temporary face ID stored for the PIT entry;

caching content contained in the data packet and forwarding the data packet to the another network element based on a determination that both the content name lookup and the temporary face ID lookup succeed; and performing one or more error handling operations based on a determination that the temporary face ID lookup fails.

17. The media of claim 15, wherein the encoding further comprises one of:

adding a label to a label stack for the data packet, wherein the label includes the new temporary face ID; or generating a value using the new temporary face ID and another value contained in the data packet.

18. A network element comprising:

at least one memory element for storing data; and at least one processor for executing instructions associated with the data, wherein the executing causes the network element to perform operations, comprising:

receiving an interest packet at the network element in an information-centric network, wherein the interest packet identifies content requested by a consumer;

determining whether a temporary face identifier (ID) contained in the interest packet is stored at the network element; and in response to determining that the temporary face ID is stored at the network element, determining a face of the network element based on the temporary face ID, wherein the face is an interface of the network element and includes at least one attribute; and based on a determination of the face, forwarding the interest packet to another network element without referencing a forwarding information base stored by the network element, wherein the temporary face ID and a permanent face ID identify the face of the network element connected to the another network element, and the temporary face ID is different from the permanent face ID, wherein the permanent face ID is stable over a lifetime of the face and the temporary face ID changes over the lifetime of the face based at least in part on a changed entry in the forwarding information base.

19. The network element of claim 18, wherein the executing causes the network element to perform further operations, comprising:

receiving a data packet, wherein the data packet identifies content requested by at least one consumer;

encoding a new temporary face ID into the data packet based on a particular face upon which the data packet was received by the network element;

performing a content name lookup on a Pending Interest Table (PIT) stored at the network element to determine whether a content name included in the data packet matches a content name stored in the PIT;

based on a determination that the content name included in the data packet matches a content name stored in a PIT entry of the PIT, performing a temporary face ID lookup on the PIT entry to determine whether the new temporary face ID matches a temporary face ID stored for the PIT entry;

caching content contained in the data packet and forwarding the data packet to the another network element based on a determination that both the content name lookup and the temporary face ID lookup succeed; and performing one or more error handling operations based on a determination that the temporary face ID lookup fails.

20. The network element of claim 18, wherein the executing causes the network element to perform further operations, comprising:

sending a negative acknowledgement (NACK) to the consumer rather than forwarding the interest packet based on a determination that the temporary face ID is not stored at the network element; or dropping the interest packet based on the determination that the temporary face ID is not stored at the network element.

* * * * *